US012641276B2

(12) United States Patent
Park et al.

(10) Patent No.: US 12,641,276 B2
(45) Date of Patent: **\*May 26, 2026**

(54) HISTORY-BASED IMAGE CODING METHOD AND APPARATUS

(71) Applicant: LG ELECTRONICS INC., Seoul (KR)

(72) Inventors: Naeri Park, Seoul (KR); Seunghwan Kim, Seoul (KR); Junghak Nam, Seoul (KR); Jaehyun Lim, Seoul (KR); Hyeongmoon Jang, Seoul (KR)

(73) Assignee: LG ELECTRONICS INC., Seoul (KR)

( \* ) Notice: Subject to any disclaimer, the term of this patent is extended or adjusted under 35 U.S.C. 154(b) by 0 days.

This patent is subject to a terminal disclaimer.

(21) Appl. No.: 18/895,269

(22) Filed: Sep. 24, 2024

(65) Prior Publication Data

US 2025/0016357 A1 Jan. 9, 2025

Related U.S. Application Data

(63) Continuation of application No. 18/215,648, filed on Jun. 28, 2023, now Pat. No. 12,137,241, which is a (Continued)

(51) Int. Cl.
| | |
|---|---|
| *H04N 19/513* | (2014.01) |
| *H04N 19/105* | (2014.01) |
| *H04N 19/115* | (2014.01) |
| *H04N 19/132* | (2014.01) |
| *H04N 19/137* | (2014.01) |
| *H04N 19/176* | (2014.01) |

(52) U.S. Cl.
CPC ......... *H04N 19/513* (2014.11); *H04N 19/105* (2014.11); *H04N 19/115* (2014.11); *H04N 19/132* (2014.11); *H04N 19/137* (2014.11); *H04N 19/176* (2014.11)

(58) Field of Classification Search
CPC ... H04N 19/513; H04N 19/115; H04N 19/176
See application file for complete search history.

(56) References Cited

U.S. PATENT DOCUMENTS

2020/0099951 A1\* 3/2020 Hung ................... H04N 19/159

FOREIGN PATENT DOCUMENTS

| WO | 2020/018241 A1 | 1/2020 |
|---|---|---|
| WO | 2020/003275 A1 | 2/2020 |

OTHER PUBLICATIONS

Zhang et al., "CE4: History-based Motion Vector Prediction (Test 4.4.7)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0266-v2.

(Continued)

*Primary Examiner* — On S Mung
(74) *Attorney, Agent, or Firm* — Bryan Cave Leighton Paisner LLP

(57) ABSTRACT

According to an embodiment disclosed in the present document, it is possible to derive a history-based motion vector prediction (HMVP) buffer for a current block based on a history, and to derive motion information of the current block based on an HMVP candidate included in the HMVP buffer, thereby increasing inter prediction efficiency.

3 Claims, 29 Drawing Sheets

Related U.S. Application Data continuation of application No. 17/863,829, filed on Jul. 13, 2022, now Pat. No. 11,729,414, which is a continuation of application No. 17/242,646, filed on Apr. 28, 2021, now Pat. No. 11,445,209, which is a continuation of application No. 16/793,789, filed on Feb. 18, 2020, now Pat. No. 11,025,945, which is a continuation of application No. PCT/KR2019/012991, filed on Oct. 4, 2019.

(60) Provisional application No. 62/740,972, filed on Oct. 4, 2018.

(56) References Cited

OTHER PUBLICATIONS

Zhao et al., "CE4: Methods of Reducing Number of Pruning Checks of History Based Motion Vector Prediction (Test 4.1.1)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0124.

* cited by examiner

KEY o  CABAC probabilitites

⇧  Pixel and MV dependency

⦷  Probabilities dependency x  Block(s) being encoded

History Buffer
Initialization

History Buffer
Initialization

FIG. 25

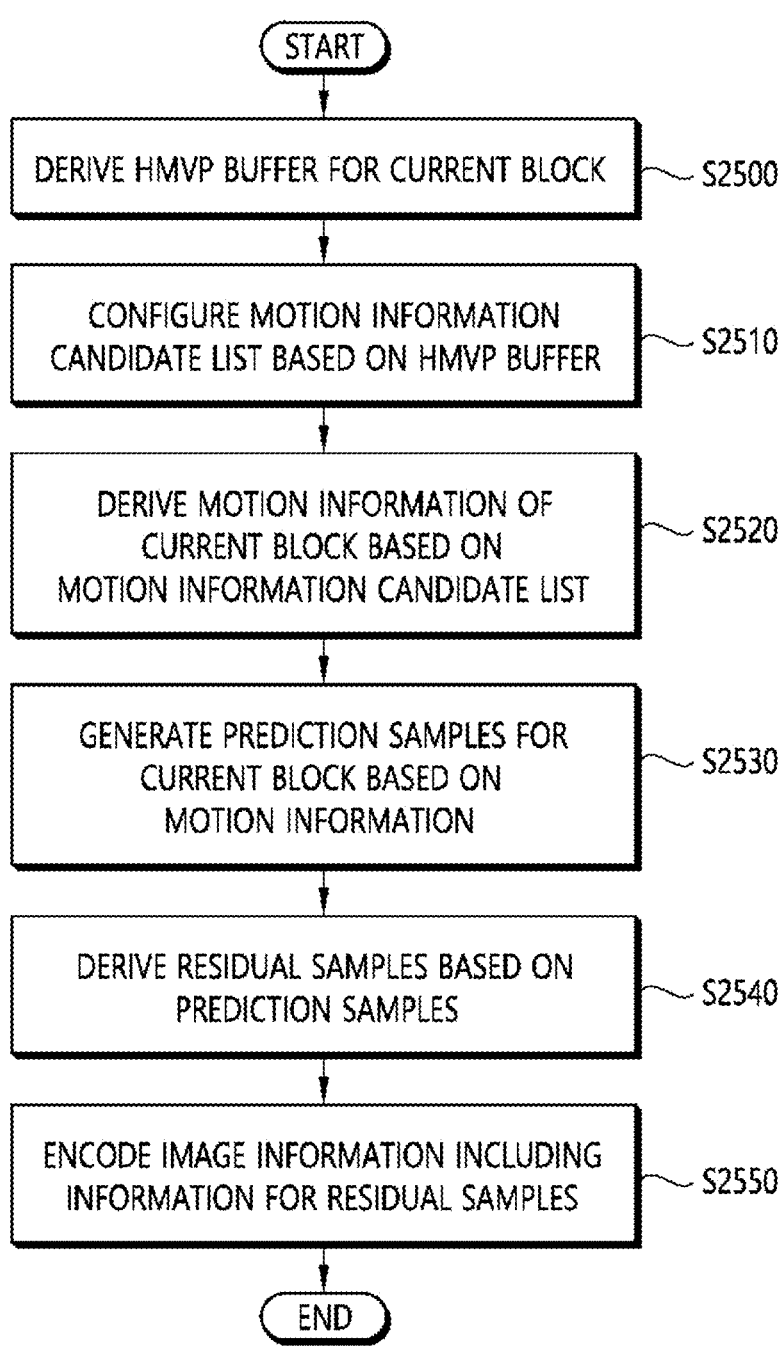

START

DERIVE HMVP BUFFER FOR CURRENT BLOCK — S2500

CONFIGURE MOTION INFORMATION CANDIDATE LIST BASED ON HMVP BUFFER — S2510

DERIVE MOTION INFORMATION OF CURRENT BLOCK BASED ON MOTION INFORMATION CANDIDATE LIST — S2520

GENERATE PREDICTION SAMPLES FOR CURRENT BLOCK BASED ON MOTION INFORMATION — S2530

DERIVE RESIDUAL SAMPLES BASED ON PREDICTION SAMPLES — S2540

ENCODE IMAGE INFORMATION INCLUDING INFORMATION FOR RESIDUAL SAMPLES — S2550

END

HISTORY-BASED IMAGE CODING METHOD AND APPARATUS

CROSS-REFERENCE TO RELATED APPLICATIONS

This application is a continuation application of U.S. patent application Ser. No. 18/215,648, filed on Jul. 13, 2022, which is a continuation application of U.S. patent application Ser. No. 17/863,829, filed on Jul. 13, 2022, which is a continuation of U.S. patent application Ser. No. 17/242,646, filed on Apr. 28, 2021 (now U.S. Pat. No. 11,445,209, issued on Sep. 13, 2022), which is continuation of U.S. patent application Ser. No. 16/793,789, filed on Feb. 18, 2020, (now U.S. Pat. No. 11,025,945, issued on Jun. 1, 2021), which is a continuation of International Application No. PCT/KR2019/012991, filed on O Oct. 4, 2019, which claims the benefit of U.S. Provisional Application No. 62/740,972, filed on Oct. 4, 2018, the contents of which are all hereby incorporated by reference herein in their entirety.

TECHNICAL FIELD

The present disclosure relates to image coding, and more particularly, to a history-based image coding method and apparatus.

BACKGROUND

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above

SUMMARY

An object of the present disclosure is to provide a method and apparatus for increasing image coding efficiency.

Another object of the present disclosure is to provide an efficient inter prediction method and apparatus.

Still another object of the present disclosure is to provide a method and apparatus for deriving a history-based motion vector.

Yet another object of the present disclosure is to provide a method and apparatus for efficiently deriving a history-based motion vector prediction (HMVP) candidate.

Still yet another object of the present disclosure is to provide a method and apparatus for efficiently updating an HMVP buffer.

A further object of the present disclosure is to provide a method and apparatus for efficiently initializing an HMVP buffer.

An embodiment of the present document provides an image decoding method performed by a decoding apparatus. The method includes deriving a history-based motion vector prediction (HMVP) buffer for a current block, configuring a motion information candidate list based on an HMVP candidate included in the HMVP buffer, deriving motion information of the current block based on the motion information candidate list, generating prediction samples for the current block based on the motion information, and generating reconstructed samples based on the prediction samples, and one or more tiles are present in a current picture, and the HMVP buffer is initialized at a firstly-ordered CTU in a CTU row including the current block in a current tile.

Another embodiment of the present document provides a decoding apparatus configured to perform image decoding. The decoding apparatus includes a predictor configured to derive a history-based motion vector prediction (HMVP) buffer for a current block, to configure a motion information candidate list based on an HMVP candidate included in the HMVP buffer, to derive motion information of the current block based on the motion information candidate list, and to generate prediction samples for the current block based on the motion information, and an adder configured to generate reconstructed samples based on the prediction samples, and one or more tiles are present in a current picture, and the HMVP buffer is initialized at a firstly-ordered CTU of a CTU row including the current block in a current tile.

Still another embodiment of the present document provides an image encoding method performed by an encoding apparatus. The method includes deriving a history- based motion vector prediction (HMVP) buffer for a current block, configuring a motion information candidate list based on an HMVP candidate included in the HMVP buffer, deriving motion information of the current block based on the motion information candidate list, generating prediction samples for the current block based on the motion information, deriving residual samples based on the prediction samples, and encoding image information including information on the residual samples, and one or more tiles are present in a current picture, and the HMVP buffer is initialized at a firstly-ordered CTU of a CTU row including the current block in a current tile.

Yet another embodiment of the present document provides an encoding apparatus configured to perform image encoding. The encoding apparatus includes a predictor configured to derive a history-based motion vector prediction (HMVP) buffer for a current block, to configure a motion information candidate list based on an HMVP candidate included in the HMVP buffer, to derive motion information of the current block based on the motion information candidate list, and to generate prediction samples for the current block based on the motion information, a residual processor configured to derive residual samples based on the prediction samples, and an entropy encoder configured to encode image information including information on the residual samples, and one or more tiles are present in a current picture, and the HMVP buffer is initialized at a firstly-ordered CTU of a CTU row including the current CTU in a current tile.

Still yet another embodiment of the present document provides a digital storage medium in which image data including encoded image information generated according to an image encoding method performed by an encoding apparatus is stored.

A further embodiment of the present document provides a digital storage medium in which image data including encoded image information causing a decoding apparatus to perform the image decoding method is stored.

According to an embodiment of the present document, it is possible to increase the overall image/video compression efficiency.

According to an embodiment of the present document, it is possible to reduce the amount of data transmitted required for residual processing through the efficient inter prediction.

According to an embodiment of the present document, it is possible to efficiently manage the HMVP buffer.

According to an embodiment of the present document, it is possible to support the parallel processing through the efficient HMVP buffer management.

According to an embodiment of the present document, it is possible to efficiently derive the motion vector for the inter prediction.

BRIEF DESCRIPTION OF THE DRAWINGS

FIGS. 25 and 26 are diagrams schematically showing an example of a video/image encoding method and related components including an inter prediction method according to an embodiment(s) of the present document.

DESCRIPTION OF EXEMPLARY EMBODIMENTS

Figure 1:
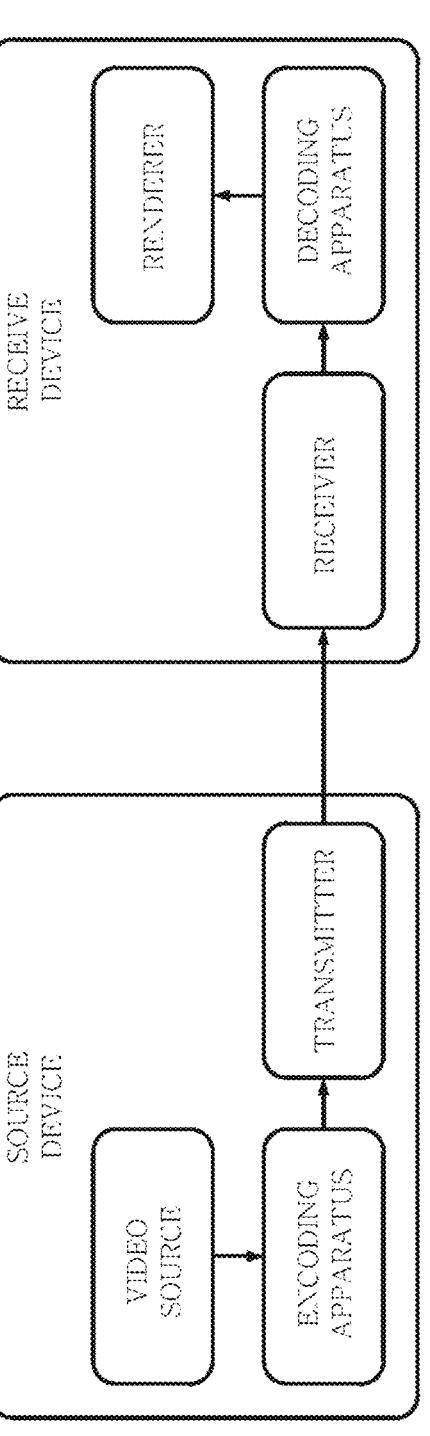
FIG. 1 is a diagram schematically showing an example of a video/image coding system to which embodiments of the present document may be applied.

The method presented in the present document may be modified in various forms, and specific examples thereof will be described and illustrated in the drawings. The terms used in the following description are used to merely describe specific embodiment, but are not intended to limit the technical idea of the presented method in the present document. An expression of a singular number includes an expression of 'at least one', so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, the respective structures in the drawings of the present specification are provided independently from each other for the convenience of describing different characteristic functions, which, however, does not indicate that each structure should be implemented by separate hardware or separate software. For example, each structure may be implemented by a combination of two or more structures, or one structure may be split into a plurality of structures. An embodiment in which structures are integrated into one and/or separated from each other should be regarded as belonging to the scope of the present specification unless it departs from the technical spirit of a method disclosed in the present specification.

The present document relates to video/image coding. For example, the method/embodiment disclosed in the present document may be applied to the method disclosed in the versatile video coding (VVC) standard. In addition, the methods/embodiments disclosed in the present document may be applied to a method disclosed in the EVC (essential video coding) standard, the AOMedia Video 1 (AV1) standard, the 2nd generation of audio video coding standard (AVS2), or the next generation video/image coding standard (ex. H.267 or H.268, etc.).

The present document presents various embodiments of video/image coding, and the embodiments may be performed in combination with each other unless otherwise mentioned.

In the present document, a video may refer to a series of images over time. A picture generally refers to the unit representing one image at a particular time frame, and a slice/tile refers to the unit constituting the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUS partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specified sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. In the present document, a tile group and a slice may be used interchangeably. For example, in the present document, a tile group/tile group header may also be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present document should be interpreted to indicate "additionally or alternatively."

Hereinafter, embodiments of the present document will be described in more detail with reference to the accompanying drawings. Hereinafter, the same components on the drawings use the same reference numerals and redundant descriptions of the same components may be omitted.

FIG. 1 illustrates an example of a video/image coding system to which embodiments of the present specification may be applied.

Referring to FIG. 1, a video/image coding system may include a first apparatus (source device) and a second apparatus (reception device). The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
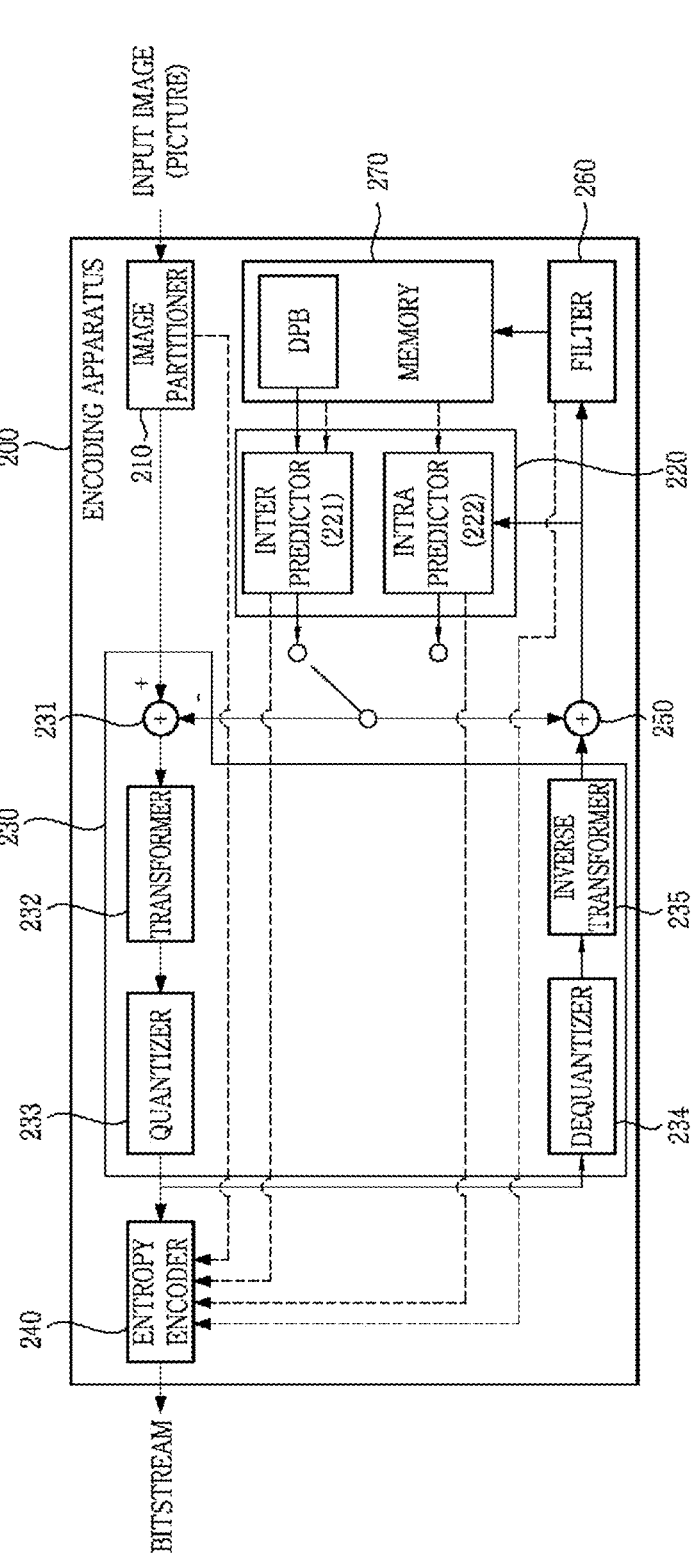
FIG. 2 is a diagram schematically explaining a configuration of a video/image encoding apparatus to which embodiments of the present document may be applied.

FIG. 2 illustrates a structure of a video/image encoding apparatus to which embodiments of the present specification may be applied. In what follows, a video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
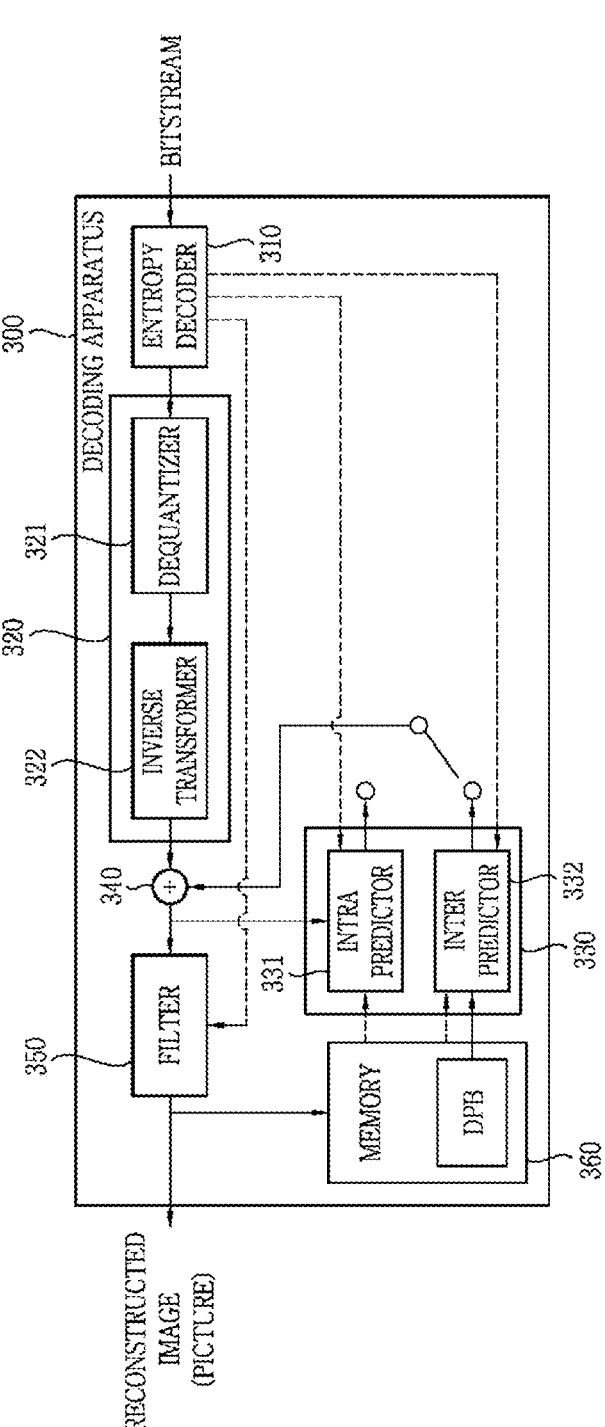
FIG. 3 is a diagram schematically explaining a configuration of a video/image decoding apparatus to which embodiments of the present document may be applied.

FIG. 3 illustrates a structure of a video/image decoding apparatus to which embodiments of the present specification may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, prediction is performed to increase compression efficiency. Therefore, a predicted block including the prediction samples for the current block which is a coding target block may be generated. Here, the predicted block includes the prediction samples in a spatial domain (or pixel domain). The predicted block is derived identically in the encoding apparatus and the decoding apparatus, and the encoding apparatus may signal information on the residual (residual information) between the original block and the predicted block, rather than the original sample value itself of the original block, to the decoding apparatus, thereby increasing image coding efficiency. The decoding apparatus may derive a residual block including residual samples based on the residual information, generate a reconstructed block including reconstructed samples by summing the residual block and the predicted block, and generate a reconstructed picture including the reconstructed blocks.

The residual information may be generated through transform and quantization procedures. For example, the encoding apparatus may signal related residual information (through a bitstream) to the decoding apparatus by deriving the residual block between the original block and the predicted block, deriving transform coefficients by performing the transform procedure for the residual samples (residual sample array) included in the residual block, and deriving quantized transform coefficients by performing the quantization procedure for the transform coefficients. Here, the residual information may include information such as value information, position information, transform technique, transform kernel, and quantization parameter of the quantized transform coefficients. The decoding apparatus may perform dequantization/inverse transform procedures based on the residual information and derive the residual samples (or residual blocks). The decoding apparatus may generate a reconstructed picture based on the predicted block and the residual block. The encoding apparatus may also dequantize/inversely transform the quantized transform coefficients for reference for the inter prediction of the post-picture to derive the residual block, and generate the reconstructed picture based thereon.

If the inter prediction is applied, predictors of the encoding apparatus/decoding apparatus may derive the prediction sample by performing the inter prediction in units of blocks. The inter prediction may be a prediction derived in a manner that is dependent on data elements (for example, sample values, motion information, or the like) of the picture(s) other than the current picture. If the inter prediction is applied to the current block, a predicted block (prediction sample array) for the current block may be induced, based on a reference block (reference sample array) specified by a motion vector on the reference picture indicated by a reference picture index. At this time, in order to reduce the amount of motion information transmitted in an inter prediction mode, the motion information of the current block may be predicted in units of blocks, sub-blocks, or samples based on the correlation of the motion information between the neighboring block and the current block.

The motion information may include a motion vector and a reference picture index. The motion information may further include an inter prediction type (L0 prediction, L1 prediction, Bi prediction, or the like) information. If the inter prediction is applied, the neighboring block may include a spatial neighboring block existing in the current picture and a temporal neighboring block exiting in the reference picture. The reference picture including the reference block and the reference picture including the temporal neighboring block may be the same or different. The temporal neighboring block may be called a collocated reference block, a collocated CU (colCU), or the like, and the reference picture including the temporal neighboring block may be called a collocated picture (colPic). For example, a motion information candidate list may be configured based on the neighboring blocks of the current block, and flag or index information indicating which candidate is selected (used) may be signaled to derive the motion vector and/or reference picture index of the current block. The inter prediction may be performed based on various prediction modes, and for example, in the case of a skip mode and a (normal) merge mode, the motion information of the current block may be the same as motion information of a selected neighboring block. In the case of the skip mode, unlike the merge mode, the residual signal may not be transmitted. In the case of a motion vector prediction (MVP) mode, the motion vector of the selected neighboring block may be used as a motion vector predictor, and a motion vector difference may be signaled. In this case, the motion vector of the current block may be derived by using the sum of the motion vector predictor and the motion vector difference.

A video/image encoding procedure based on the inter prediction may schematically include, for example, the following.

Figure 4:
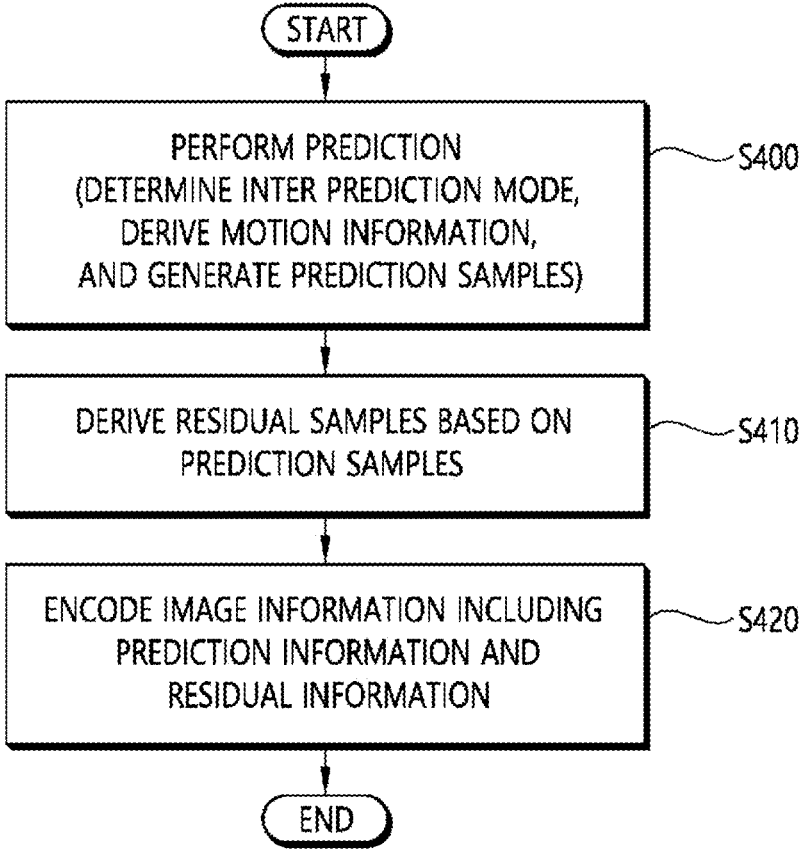
FIG. 4 is a diagram showing an example of an inter prediction-based video/image encoding method.

FIG. 4 illustrates an example of an inter prediction-based video/image encoding method.

The encoding apparatus performs the inter prediction for the current block (S400). The encoding apparatus may derive the inter prediction mode and motion information of the current block, and generate prediction samples of the current block. Here, procedures of determining the inter prediction mode, deriving the motion information, and generating the prediction samples may be performed simultaneously, or any one procedure may be performed before the other procedures. For example, an inter predictor of the encoding apparatus may include a prediction mode determinator, a motion information deriver, and a prediction sample deriver, and the prediction mode determinator may determine the prediction mode for the current block, the motion information deriver may derive the motion information of the current block, and the prediction sample deriver may derive the prediction samples of the current block. For example, the inter predictor of the encoding apparatus may search for a block, similar to the current block, in a certain region (search region) of the reference pictures through motion estimation, and derive the reference block whose difference from the current block is minimum or a certain reference or less. Based on this, a reference picture index indicating the reference picture in which the reference block is located may be derived, and a motion vector may be derived based on a position difference between the reference block and the current block. The encoding apparatus may determine a mode applied to the current block among various prediction modes. The encoding apparatus may compare RD costs for the various prediction modes and determine an optimal prediction mode for the current block.

For example, if the skip mode or the merge mode is applied to the current block, the encoding apparatus may configure a merge candidate list to be described later, and derive the reference block whose difference from the current block is minimum or a certain reference or less among the reference blocks indicated by merge candidates included in the merge candidate list. In this case, the merge candidate associated with the derived reference block may be selected, and merge index information indicating the selected merge candidate may be generated and signaled to the decoding apparatus. The motion information of the current block may be derived by using the motion information of the selected merge candidate.

As another example, if an (A)MVP mode is applied to the current block, the encoding apparatus may configure an (A)MVP candidate list to be described later, and use the motion vector of the selected motion vector predictor (mvp) candidate, among the mvp candidates included in the (A)MVP candidate list, as an mvp of the current block. In this case, for example, the motion vector indicating the reference block derived by the above-described motion estimation may be used as the motion vector of the current block, and the mvp candidate whose motion vector whose difference from the motion vector of the current block is the smallest among the mvp candidates may be the selected mvp candidate. A motion vector difference (MVD) which is a difference obtained by subtracting the mvp from the motion vector of the current block may be derived. In this case, the information on the MVD may be signaled to the decoding apparatus. In addition, if the (A)MVP mode is applied, the value of the reference picture index may be configured as reference picture index information and separately signaled to the decoding apparatus.

The encoding apparatus may derive residual samples based on the prediction samples (S410). The encoding apparatus may derive the residual samples by comparing the original samples of the current block with the prediction samples.

The encoding apparatus encodes image information including prediction information and residual information (S420). The encoding apparatus may output the encoded image information in the form of a bitstream. The prediction information may include information on prediction mode information (for example, skip flag, merge flag, mode index, or the like) and motion information as information related to the prediction procedure. The information on the motion information may include candidate selection information (for example, merge index, mvp flag, or mvp index) which is information for deriving the motion vector. In addition, the information on the motion information may include the information on the MVD and/or reference picture index information described above. In addition, the information on the motion information may include information indicating whether the L0 prediction, the L1 prediction, or the bi prediction is applied. The residual information is information on the residual samples. The residual information may include information on quantized transform coefficients for the residual samples.

The output bitstream may be stored in a (digital) storage medium and delivered to the decoding apparatus, or may also be delivered to the decoding apparatus via a network.

Meanwhile, as described above, the encoding apparatus may generate a reconstructed picture (including reconstructed samples and reconstructed block) based on the reference samples and the residual samples. This is for deriving, by the encoding apparatus, the same prediction result as that derived by the decoding apparatus, and therefore it is possible to increase coding efficiency. Therefore, the encoding apparatus may store the reconstructed picture (or reconstructed samples, reconstructed block) in a memory, and use it as the reference picture for the inter prediction. As described above, an in-loop filtering procedure or the like may be further applied to the reconstructed picture.

A video/image decoding procedure based on the inter prediction may schematically include, for example, the following.

Figure 5:
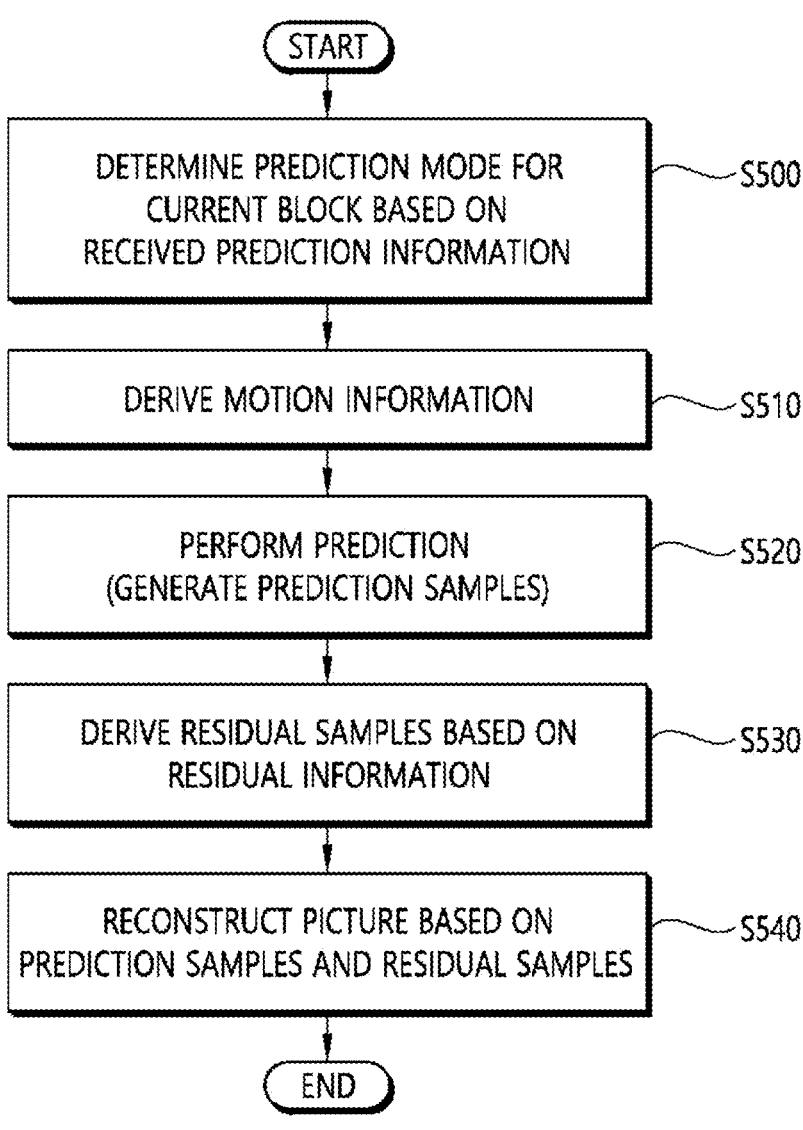
FIG. 5 is a diagram showing an example of an inter prediction-based video/image decoding method.

FIG. 5 illustrates an example of an inter prediction-based video/image decoding method.

Referring to FIG. 5, the decoding apparatus may perform an operation corresponding to the operation performed by the encoding apparatus. The decoding apparatus may perform prediction for a current block based on the received prediction information and derive prediction samples.

Specifically, the decoding apparatus may determine a prediction mode for the current block based on the received prediction information (S500). The decoding apparatus may determine an inter prediction mode applied to the current block based on prediction mode information in the prediction information.

For example, the decoding apparatus may determine whether the merge mode is applied to the current block or the (A)MVP mode is determined, based on the merge flag. Alternatively, the decoding apparatus may select one of various inter prediction mode candidates based on the mode index. The inter prediction mode candidates may include a skip mode, a merge mode, and/or an (A)MVP mode, or may include various inter prediction modes to be described later.

The decoding apparatus derives motion information of the current block based on the determined inter prediction mode (S510). For example, if the skip mode or the merge mode is applied to the current block, the decoding apparatus may configure a merge candidate list to be described later, and select one merge candidate among the merge candidates included in the merge candidate list. The selection may be performed based on the above-described selection information (merge index). The motion information of the current block may be derived by using the motion information of the selected merge candidate. The motion information of the selected merge candidate may be used as the motion information of the current block.

As another example, if the (A)MVP mode is applied to the current block, the decoding apparatus may configure an (A)MVP candidate list to be described later, and use the motion vector of the selected motion vector predictor (mvp) candidate, among the mvp candidates included in the (A)MVP candidate list, as the mvp of the current block. The selection may be performed based on the above-described selection information (mvp flag or mvp index). In this case, the MVD of the current block may be derived based on the information on the MVD, and the motion vector of the current block may be derived based on the mvp and MVD of the current block. In addition, a reference picture index of the current block may be derived based on the reference picture index information. A picture indicated by the reference picture index in the reference picture list on the current block may be derived as the reference picture referred to for the inter prediction of the current block.

Meanwhile, as described later, the motion information of the current block may be derived without configuring the candidate list, and in this case, the motion information of the current block may be derived according to a procedure disclosed in a prediction mode to be described later. In this case, the candidate list configuration described above may be omitted.

The decoding apparatus may generate prediction samples for the current block based on the motion information of the current block (S520). In this case, the decoding apparatus may derive the reference picture based on the reference picture index of the current block, and derive the prediction samples of the current block by using the samples of the reference block indicated by the motion vector of the current block on the reference picture. In this case, as described later, a prediction sample filtering procedure for all or some of the prediction samples of the current block may be further performed in some cases.

For example, an inter predictor of the decoding apparatus may include a prediction mode determinator, a motion information deriver, and a prediction sample deriver, and the prediction mode determinator may determine the prediction mode for the current block based on the received prediction mode information, the motion information deriver may derive the motion information (such as motion vector and/or reference picture index) of the current block based on the information on the received motion information, and the prediction sample deriver may derive the prediction samples of the current block.

The decoding apparatus generates residual samples for the current block based on the received residual information (S530). The decoding apparatus may generate reconstructed samples for the current block based on the prediction samples and the residual samples, and generate a reconstructed picture based thereon (S540). Thereafter, an in-loop filtering procedure or the like may be further applied to the reconstructed picture as described above.

Figure 6:
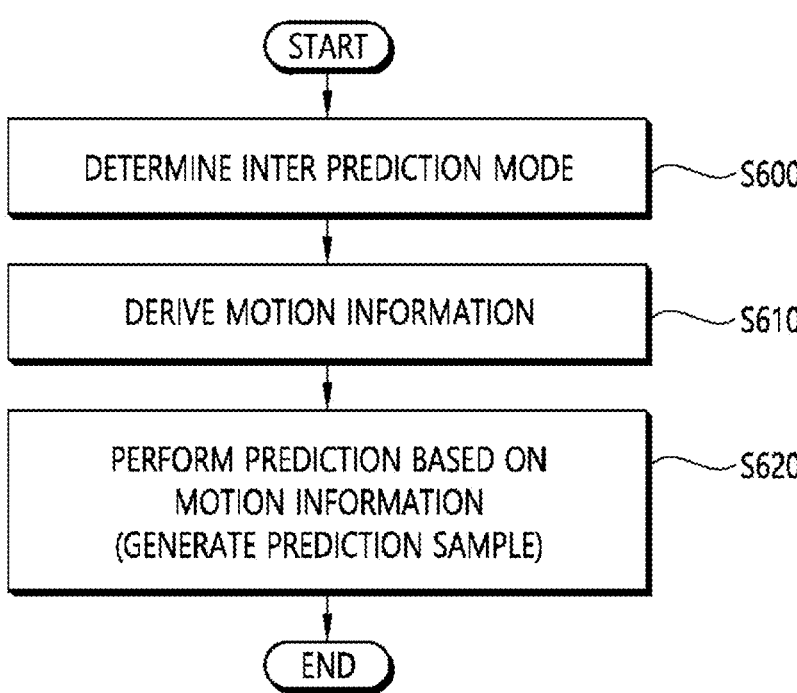
FIG. 6 is a diagram exemplarily showing an inter prediction procedure.

FIG. 6 exemplarily illustrates an inter prediction procedure.

Referring to FIG. 6, as described above, the inter prediction procedure may include determining an inter prediction mode, deriving motion information according to the determined prediction mode, and performing prediction (generating a prediction sample) based on the derived motion information. The inter prediction procedure may be performed by the encoding apparatus and the decoding apparatus as described above. The coding apparatus in this document may include the encoding apparatus and/or the decoding apparatus.

Referring to FIG. 6, the coding apparatus determines the inter prediction mode for the current block (S600). Various inter prediction modes may be used for prediction of the current block in the picture. For example, various modes, such as a merge mode, a skip mode, a motion vector prediction (MVP) mode, an affine mode, a sub-block merge mode, and a merge with MVD (MMVD) mode, may be used. A decoder side motion vector refinement (DMVR) mode, an adaptive motion vector resolution (AMVR) mode, a Bi-prediction with CU-level weight (BCW), a Bi-directional optical flow (BDOF), and the like may be used additionally or instead of the modes as the incidental modes. The affine mode may be called an affine motion prediction mode. The MVP mode may be called an advanced motion vector prediction (AMVP) mode. In this document, some mode and/or the motion information candidate derived by some modes may also be included as one of the motion information related candidates in another mode. For example, the HMVP candidate may be added as a merge candidate in the merge/skip modes, or may be added as an mvp candidate in the MVP mode. If the HMVP candidate is used as the motion information candidate in the merge mode or the skip mode, the HMVP candidate may be called an HMVP merge candidate.

The prediction mode information indicating the inter prediction mode of the current block may be signaled from the encoding apparatus to the decoding apparatus. The prediction mode information may be included in a bitstream and received by the decoding apparatus. The prediction mode information may include index information indicating one of a plurality of candidate modes. Alternatively, the prediction mode information may also indicate the inter prediction mode through hierarchical signaling of flag information. In this case, the prediction mode information may include one or more flags. For example, the prediction mode information may indicate whether to apply a skip mode, by signaling a skip flag, indicate whether to apply the merge mode, by signaling a merge flag if the skip mode is not applied, and indicate that the MVP mode is applied or further signal a flag for additional classification if the merge mode is not applied. The affine mode may be signaled as an independent mode, or may be signaled as a mode which is dependent on the merge mode, the MVP mode, or the like. For example, the affine mode may include an affine merge mode and an affine MVP mode.

The coding apparatus derives motion information for the current block (S610). The motion information may be derived based on the inter prediction mode.

The coding apparatus may perform the inter prediction by using the motion information of the current block. The encoding apparatus may derive optimal motion information for the current block through a motion estimation procedure. For example, the encoding apparatus may search for a similar reference block having a high correlation in units of fractional pixels in a predetermined search range in the reference picture, by using the original block in the original picture for the current block, thereby deriving the motion information. Similarity of block may be derived based on the difference between phase based sample values. For example, the similarity of the block may be calculated based on the SAD between the current block (or template of the current block) and the reference block (or template of the reference block). In this case, the motion information may be derived based on a reference block having the smallest SAD in the search region. The derived motion information may be signaled to the decoding apparatus according to various methods based on the inter prediction mode.

The coding apparatus performs the inter prediction based on the motion information for the current block (S620). The coding apparatus may derive the prediction sample(s) for the current block based on the motion information. The current block including the prediction samples may be called a predicted block.

Meanwhile, according to the conventional merge or AMVP mode in the inter prediction, a method of reducing the amount of motion information by using the motion vector of the spatial/temporal neighboring block of the current block as a motion information candidate has been used. For example, neighboring blocks used to derive motion information candidates of the current block could include a left lower corner neighboring block, a left neighboring block, a right upper corner neighboring block, an upper neighboring block, and a left upper corner neighboring block of the current block.

Figure 7:
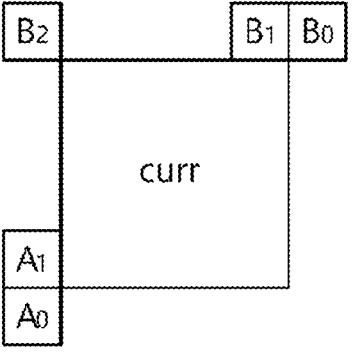
FIG. 7 is a diagram exemplarily showing spatial neighboring blocks used for deriving a motion information candidate in a conventional merge or AMVP mode.

FIG. 7 exemplarily illustrates spatial neighboring blocks used for deriving a motion information candidate in the conventional merge or AMVP mode.

Basically, the spatial neighboring block has been limited to a block directly contacting the current block. This is for increasing hardware implementability, and is because an issue such as an increase in a line buffer occurs in order to induce information of a block far away from the current block. However, the use of the motion information of non-neighboring block in order to derive the motion information candidate of the current block may constitute various candidates, thereby improving performance. A History-based Motion Vector Prediction (HMVP) method may be used to use the motion information of non-neighboring block without increasing the line buffer. In this document, the HMVP may represent a History-based Motion Vector Prediction or a History-based Motion Vector Predictor. According to the present document, it is possible to efficiently perform the inter prediction and to support parallel processing, by using the HMVP. For example, the embodiments of the present document propose various methods of managing a history buffer for parallelization processing, and the parallel processing may be supported based on the methods. However, supporting the parallel processing does not mean that the parallel processing is necessarily performed, and the coding apparatus may or may not perform the parallel processing in consideration of hardware performance or service type. For example, if the coding apparatus has a multi-core processor, the coding apparatus may process some of the slices, bricks, and/or tiles in parallel. Meanwhile, even when the coding apparatus has a single core processor or has a multi-core processor, the coding apparatus may perform sequential processing while reducing computation and memory burden.

The HMVP candidate according to the above-described HMVP method may include motion information of a previously coded block. For example, the motion information of the previously coded block according to the block coding order in the current picture has not been considered as the motion information of the current block if the previously coded block is not neighboring to the current block. However, the HMVP candidate may be considered as a motion information candidate (for example, merge candidate or MVP candidate) of the current block without considering whether the previously coded block is neighboring to the current block. In this case, a plurality of HMVP candidates may be stored in a buffer. For example, if the merge mode is applied to the current block, the HMVP candidate (HMVP merge candidate) may be added to the merge candidate list. In this case, the HMVP candidate may be added after the spatial merge candidates and the temporal merge candidate included in the merge candidate list.

According to the HMVP method, the motion information of the previously coded block may be stored in the form of a table, and used as the motion information candidate (for example, merge candidate) of the current block. A table (or buffer or list) including a plurality of HMVP candidates may be maintained during the encoding/decoding procedures. The table (or buffer or list) may be called an HMVP table (or buffer or list). According to an embodiment of the present document, the table (or buffer or list) may be initialized when encountering a new slice. Alternatively, according to an embodiment of the present document, the table (or buffer or list) may be initialized when encountering a new CTU row. If the table is initialized, the number of HMVP candidates included in the table may be set to zero. The size of the table (or buffer or list) may be fixed to a specific value (for example, 5 or the like). For example, if an inter coded block exists, associated motion information may be added to the last entry of the table as a new HMVP candidate. The (HMVP) table may be called a (HMVP) buffer or a (HMVP) list.

Figure 8:
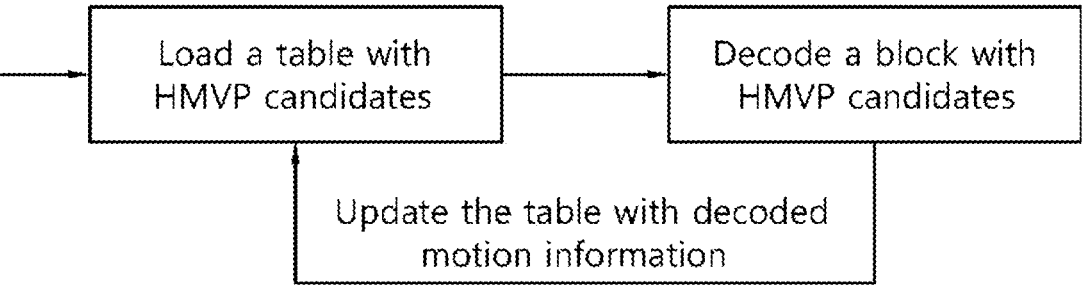
FIG. 8 is a diagram schematically showing an example of an HMVP candidate-based decoding procedure.

FIG. 8 schematically illustrates an example of an HMVP candidate-based decoding procedure. Here, the HMVP candidate-based decoding procedure may include an HMVP candidate-based inter prediction procedure.

Referring to FIG. 8, the decoding apparatus loads the HMVP table including the HMVP candidate(s), and decodes the block based on at least one of the HMVP candidate(s). Specifically, for example, the decoding apparatus may derive the motion information of the current block based on at least one of the HMVP candidate(s), and derive the predicted block (including the prediction sample) by performing the inter prediction for the current block based on the motion information. As described above, a reconstructed block may be generated based on the predicted block. The derived motion information of the current block may be updated in the table. In this case, the motion information may be added to the last entry of the table as a new HMVP candidate. If the number of HMVP candidates previously included in the table is equal to the size of the table, the candidate which first enters the table may be deleted, and the derived motion information may be added to the last entry of the table as a new HMVP candidate.

Figure 9:
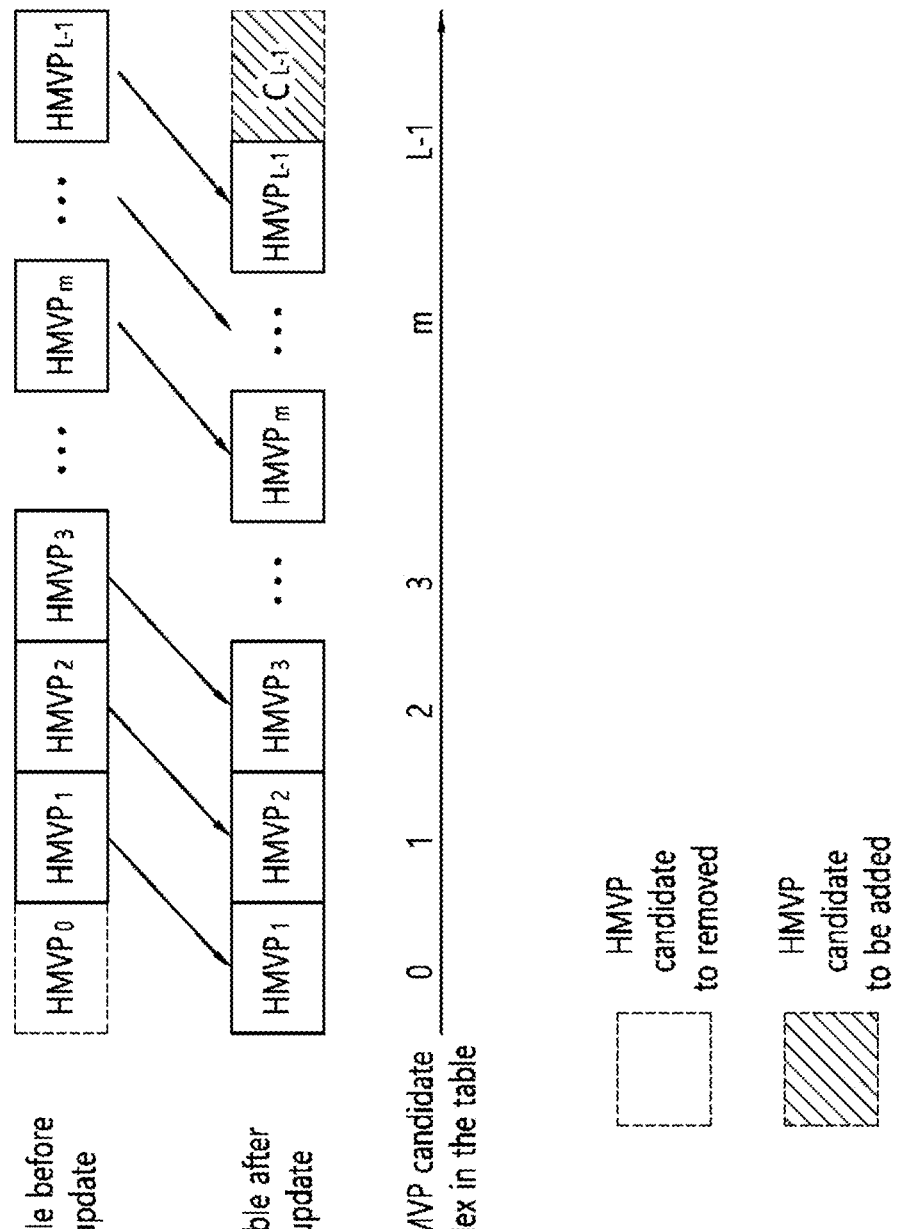
FIG. 9 is a diagram exemplarily showing an HMVP table update according to a FIFO rule.
Figure 10:
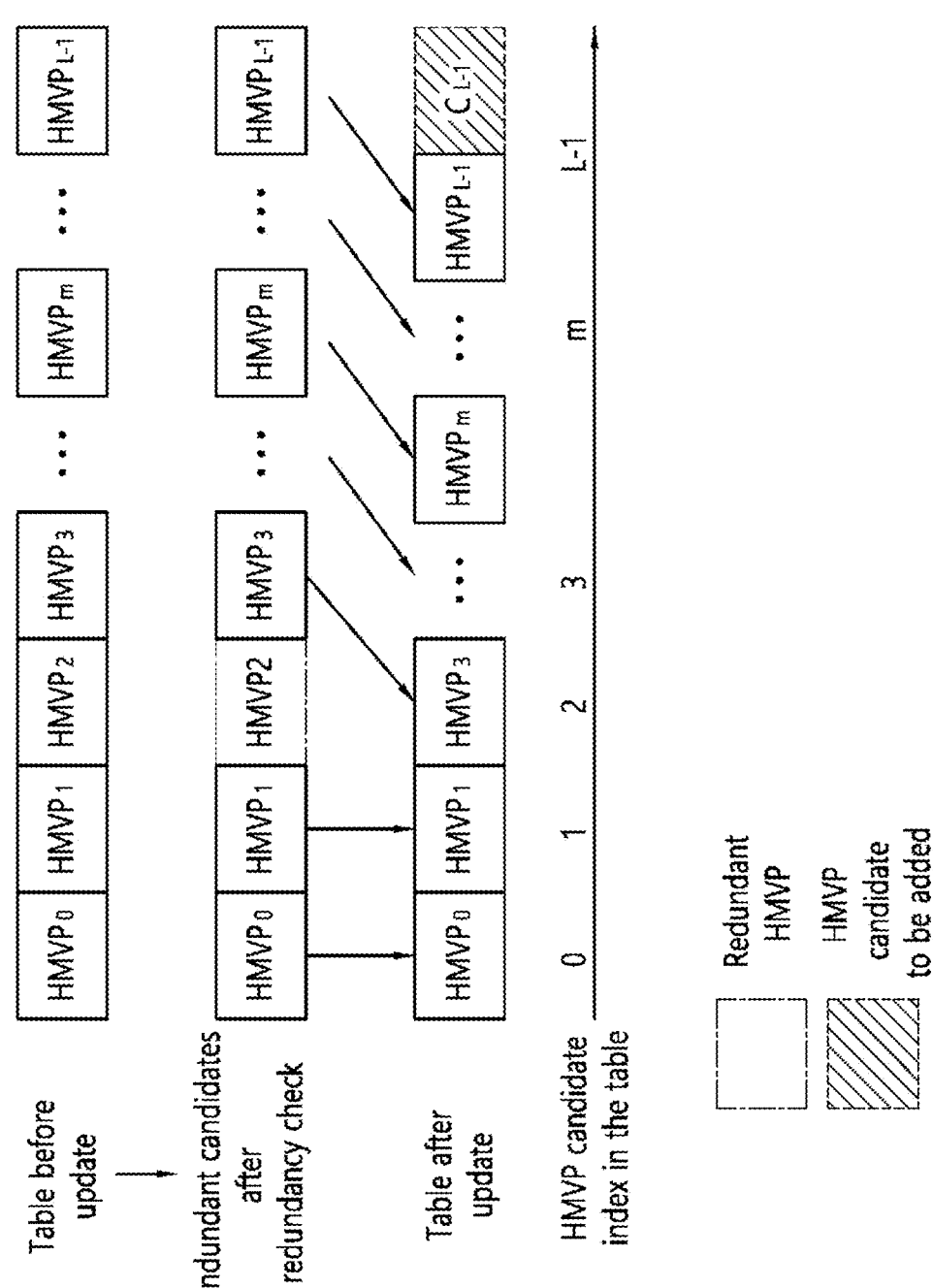
FIG. 10 is a diagram exemplarily showing an HMVP table update according to a limited FIFO rule.

FIG. 9 exemplarily illustrates HMVP table update according to a first-in-first-out (FIFO) rule, and FIG. 10 exemplarily illustrates HMVP table update according to a limited FIFO rule.

A FIFO rule may be applied to the table. For example, if a table size (S) is 16, this indicates that 16 HMVP candidates may be included in the table. If more than 16 HMVP candidates are generated from the previously coded blocks, a FIFO rule may be applied, and therefore the table may include up to 16 motion information candidates coded most recently. In this case, as shown in FIG. 9, the FIFO rule may be applied so that the oldest HMVP candidate may be eliminated, and a new HMVP candidate may be added.

Meanwhile, in order to further improve coding efficiency, a limited FIFO rule may also be applied as shown in FIG. 10. Referring to FIG. 10, when the HMVP candidate is inserted into the table, a redundancy check may be applied first. Therefore, it may be determined whether the HMVP candidate having the same motion information already exists in the table. If the HMVP candidate having the same motion information exists in the table, the HMVP candidate having the same motion information may be eliminated from the table, the HMVP candidates after the eliminated HMVP candidate may move by one space (that is, respective Indexes-1), and then a new HMVP candidate may be inserted.

As described above, the HMVP candidates may be used in a merge candidate list configuration procedure. In this case, for example, all HMVP candidates insertable from the last entry to the first entry in the table may be inserted after the spatial merge candidates and the temporal merge candidate. In this case, a pruning check may be applied to the HMVP candidates. The maximum number of allowable merge candidates may be signaled, and if the total number of available merge candidates reaches the maximum number of merge candidates, the merge candidate list configuration procedure may be ended.

Similarly, the HMVP candidates may also be used in the (A)MVP candidate list configuration procedure. In this case, the motion vectors of the last k HMVP candidates in the HMVP table may be added after TMVP candidates configuring the MVP candidate list. In this case, for example, an HMVP candidate having the same reference picture as the MVP target reference picture may be used for configuring the MVP candidate list. Here, the MVP target reference picture may represent the reference picture for the inter prediction of the current block to which the MVP mode has been applied. In this case, the pruning check may be applied to the HMVP candidates. The k may be, for example, 4. However, this is an example and the k may have various values such as 1, 2, 3, and 4.

Meanwhile, if the total number of merge candidates is equal to or larger than 15, a truncated unary plus fixed length (with 3 bits) binarization method may be applied for merge index coding as in Table 1 below.

TABLE 1

| merge index | Bin String | | | | | | | | | |
|---|---|---|---|---|---|---|---|---|---|---|
| 0 | 0 | | | | | | | | | |
| 1 | 1 | 0 | | | | | | | | |
| 2 | 1 | 1 | 0 | | | | | | | |
| . . . | | | | | | | | | | |
| 5 | 1 | 1 | 1 | 1 | 1 | 0 | | | | |
| 6 | 1 | 1 | 1 | 1 | 1 | 1 | 0 | | | |
| 7 | 1 | 1 | 1 | 1 | 1 | 1 | 1 | 0 | 0 | 0 |
| 8 | 1 | 1 | 1 | 1 | 1 | 1 | 1 | 0 | 0 | 1 |
| . . . | | | | | | | | | | |
| 14 | 1 | 1 | 1 | 1 | 1 | 1 | 1 | 1 | 1 | 1 |
| Bin index | 0 | 1 | 2 | 3 | 4 | 5 | 6 | 7 | 8 | 9 |

The table is based on the assumption that Nmrg=15, where the Nmrg refers to the total number of merge candidates.

Meanwhile, parallel processing may be supported in the image/video coding for optimizing implementation when developing a solution applying video codec.

Figure 11:
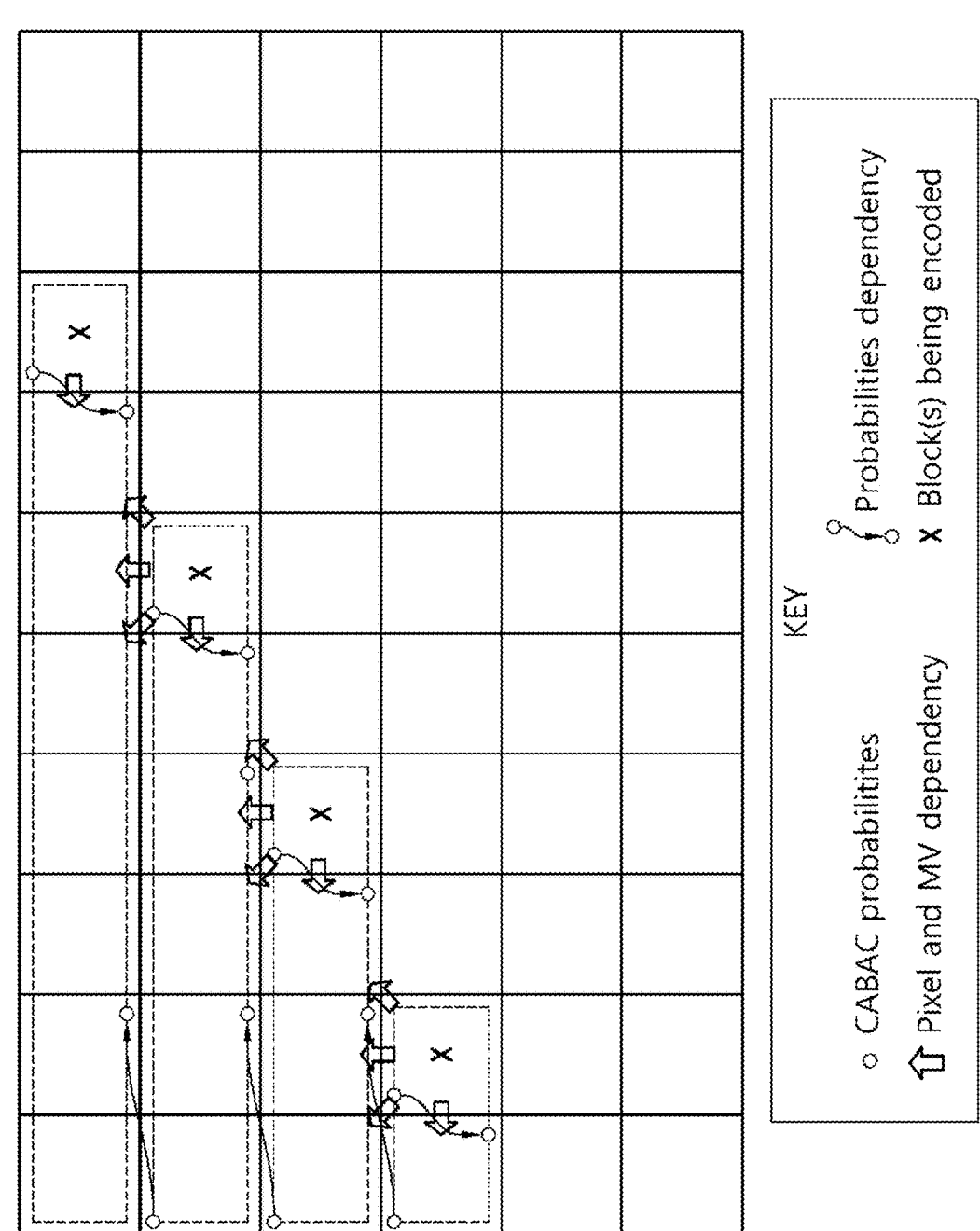
FIG. 11 is a diagram exemplarily showing a Wavefront Parallel Processing (WPP) which is one of the techniques for parallel processing.

FIG. 11 exemplarily illustrates Wavefront Parallel Processing (WPP), which is one of the techniques for parallel processing.

Referring to FIG. 11, if the WPP is applied, the parallelization processing may be performed in units of CTU rows. In this case, when coding (encoding/decoding) X-marked blocks, there exist a position and dependency indicated by the arrow. Therefore, it is necessary to wait for the right upper CTU of the block to be currently coded to be completely coded. In addition, if the WPP is applied, the initialization of the CABAC probability table (or context information) may be performed in units of slices, and in order to perform the parallelization processing including the entropy encoding/decoding, the CABAC probability table (or context information) needs to be initialized in units of CTU rows. The WPP may be regarded as a proposed technology for determining an efficient initialization position. If the WPP is applied, the respective LCT rows may be called a substream, and the parallel processing may be supported if the coding apparatus has a plurality of processing cores. For example, in the case where the WPP is applied, if three processing cores process decoding in parallel, a first processing core may decode a substream 0, a second processing core may decode a substream 1, and a third processing core may decode a substream 2. If the WPP is applied, coding may be performed for an nth-ordered (n is an integer) substream, coding may be completed for a secondly-ordered CTU or LCU of the nth-ordered substream, and then coding may be performed for an n+1th-ordered substream. For example, in the case of the entropy coding, if the entropy coding for the second LCU of the nth-ordered substream is completed, the first LCU of the n+1th-ordered substream is entropy-coded based on the context information for the second LCU of the nth-ordered substream. At this time, the number of substreams in the slice may be equal to the number of LCU rows. In addition, the number of substreams in the slice may be equal to the number of entry points. At this time, the number of entry points may be specified by the number of entry point offsets. For example, the number of entry points may have a value greater by 1 than the number of entry point offsets. Information on the number of entry point offsets and/or information on the values of the offsets may be included in the above-described video/image information and encoded, and may be signaled to the decoding apparatus through the bitstream. Meanwhile, if the coding apparatus includes one processing core, the coding processing may be performed in one substream unit, thereby reducing memory load and coding dependency.

The above-described HMVP method stores, as a candidate, motion information derived from a coding procedure of each block by the size of a predetermined buffer (HMVP table). In this case, as disclosed in FIG. 9 without any additional condition, buffers may be filled with candidates as many as the number of buffers, or may also be filled with candidates which are not redundant through redundancy check between the newly added candidate and the candidate existing in the buffer (HMVP table). Therefore, various candidates may be configured. However, when developing a solution to which video codec is applied, it is generally impossible to know when the buffer is filled with the HMVP candidates, such that it is impossible to enable the parallel processing even if the WPP is applied or the WPP is not applied.

Figure 12:
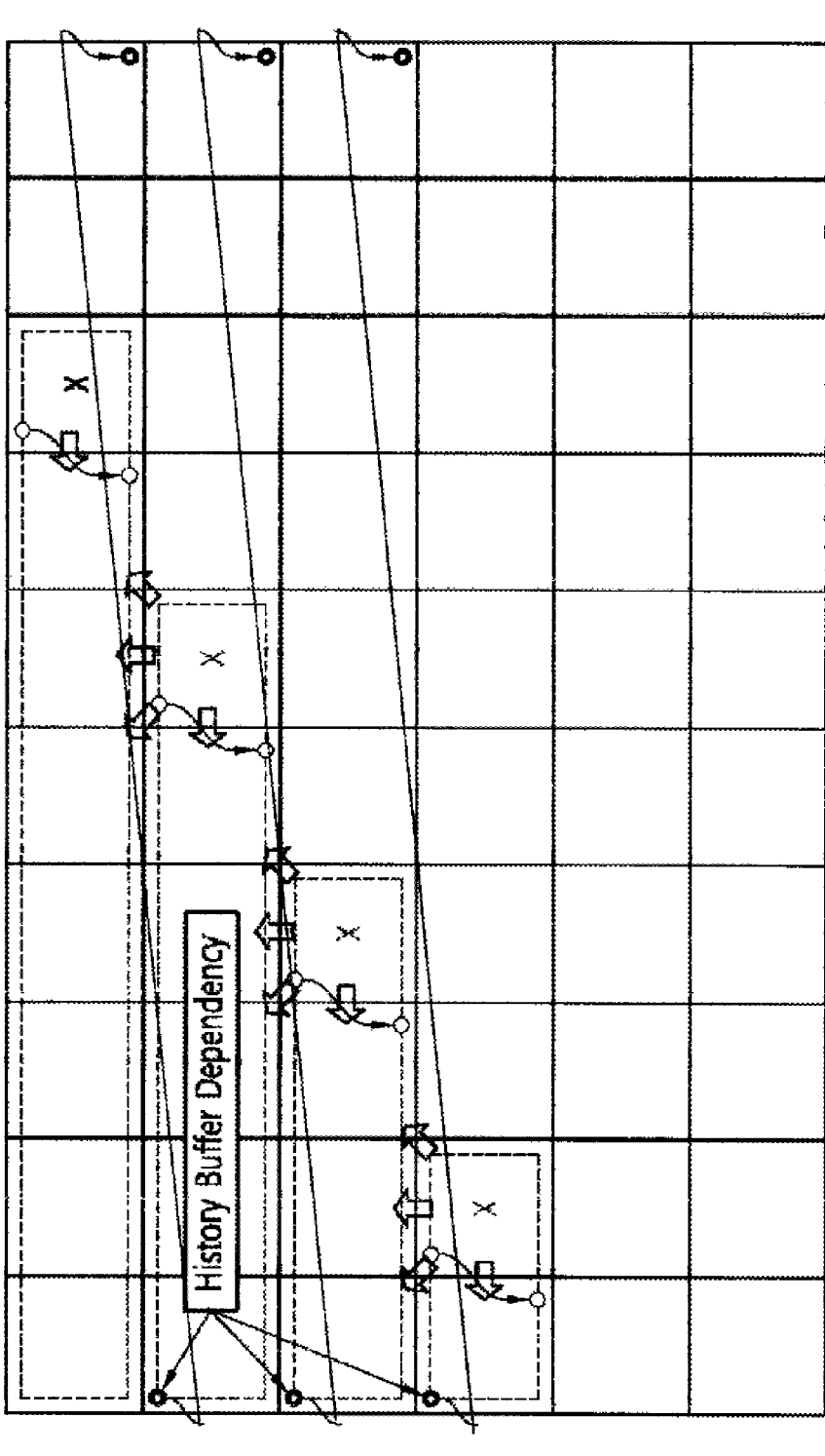
FIG. 12 is a diagram exemplarily showing a problem when a general HMVP method is applied in consideration of parallel processing.

FIG. 12 exemplarily illustrates a problem when applying a general HMVP method in consideration of the parallel processing.

Referring to FIG. 12, when performing parallelization in units of each CTU row as in the WPP, a dependency problem of the HMVP buffer may occur. For example, it is because the HMVP buffer for the firstly-ordered CTU in an N(N>=1) th-ordered CTU row may be filled only when the coding (encoding/decoding) of a block existing in an (N−1)th-ordered CTU row, for example, a block in the last CTU in the (N−1)th-ordered CTU row is completed. That is, if the parallel processing is applied under the current structure, the decoding apparatus may not know whether the current HMVP candidates stored in the HMVP buffer match the HMVP buffer used for decoding the current (target) block. This is because a difference may occur between the HMVP buffer derived from the coding time point of the current block when applying the sequential processing and the HMVP buffer derived from the coding time point of the current block when applying the parallel processing.

In an embodiment of the present document, in order to solve the above problem, when applying the HMVP, the history management buffer (HMVP buffer) is initialized so that the parallel processing may be supported.

Figure 13:
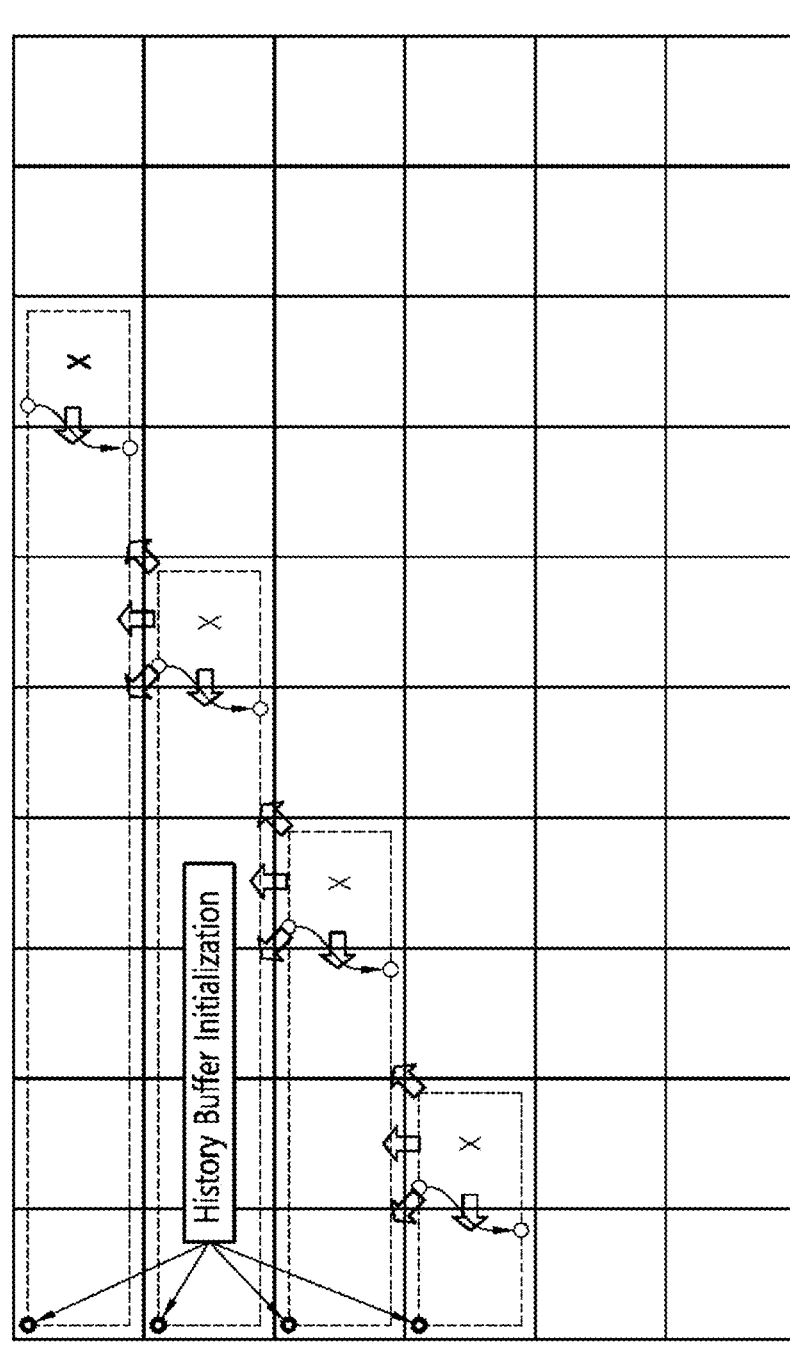
FIG. 13 is a diagram exemplarily showing an initialization method of a history management buffer (HMVP buffer) according to an embodiment of the present document.

FIG. 13 exemplarily illustrates a method of initializing a history management buffer (HMVP buffer) according to an embodiment of the present document.

Referring to FIG. 13, the HMVP buffer may be initialized for each firstly-ordered CTU of the CTU row. That is, when coding the firstly-ordered CTU of the CTU row, the HMVP buffer may be initialized so that the number of the HMVP candidates included in the HMVP buffer is zero. By initializing the HMVP buffer for each CTU row as described above, even when the parallel processing is supported, the HMVP candidates derived from the coding process of the CTUs located in the left direction of the current block may be used without constraint. In this case, for example, if the current CU which is the current block is located in the firstly-ordered CTU of the CTU row, and the current CU corresponds to the firstly-ordered CU in the firstly-ordered CTU, the number of HMVP candidates included in the HMVP buffer is zero. In addition, for example, if a CU coded earlier than the current CU in the CTU row is coded in the inter mode, the HMVP candidate may be derived based on the motion information of the earlier coded CU and included in the HMVP buffer.

Figure 14:
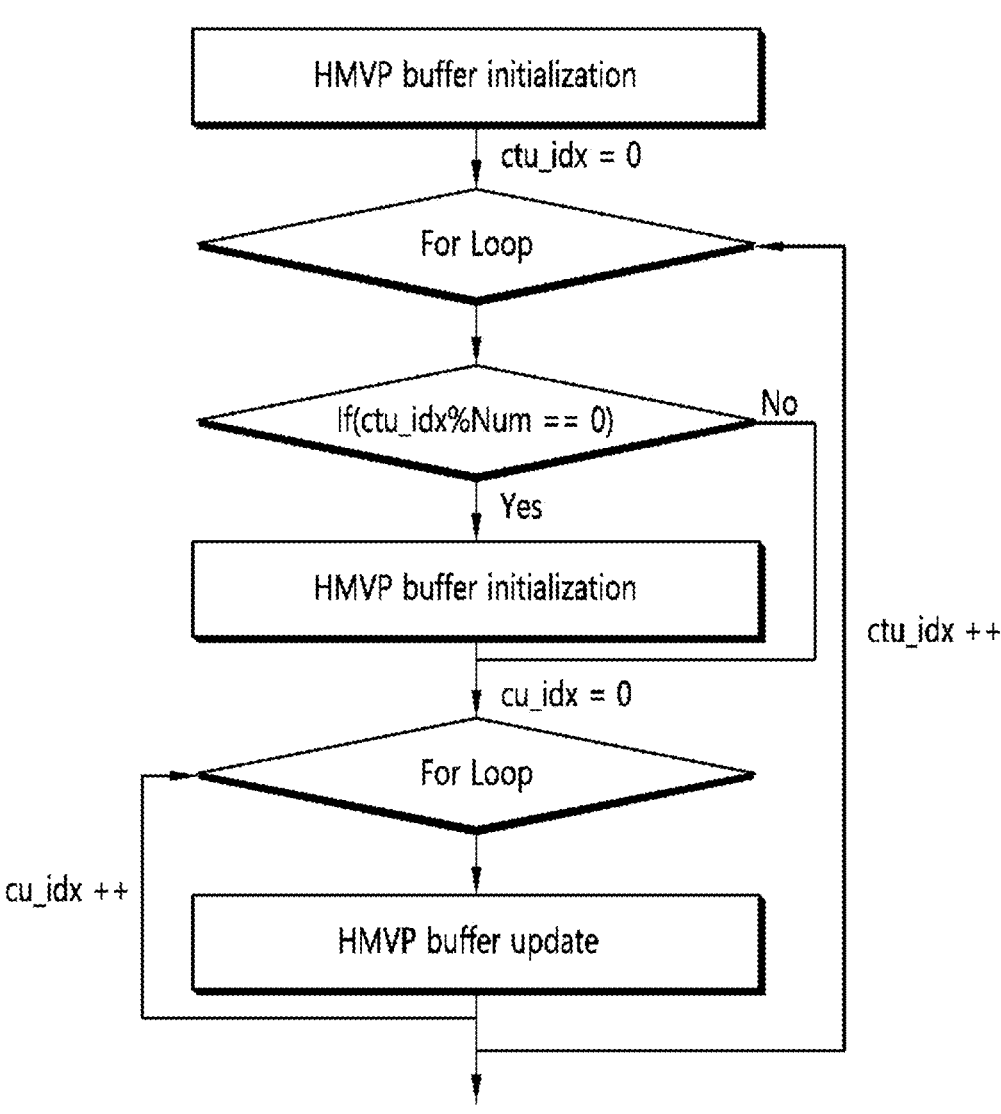
FIG. 14 is a diagram exemplarily showing an HMVP buffer management method according to an embodiment.

FIG. 14 exemplarily illustrates an HMVP buffer management method according to an embodiment.

Referring to FIG. 14, the HMVP buffer may be initialized in units of slices, and it may be determined whether a coding target CTU (current CTU) is the firstly-ordered CTU in each CTU row even with respect to the CTUs in the slice. In FIG. 14, for example, if (ctu_idx % Num) is zero, it has been described as being determined as the firstly-ordered CTU. At this time, the Num means the number of CTUs in each CTU row. As another example, in the case of using the above-described brick concept, if (ctu_idx_in_brick % Brick-Width) is zero, it may be determined as being the firstly-ordered CTU of the CTU row (in the corresponding brick). Here, the ctu_idx_in_brick refers to the index of the corresponding CTU of the brick, and the Brick Width refers to the width of the brick in units of CTUs. That is, the Brick Width may refer to the number of CTU columns in the corresponding brick. If the current CTU is the firstly-ordered CTU of the CTU row, the HMVP buffer is initialized (that is, the number of candidates in the HMVP buffer is set to zero), otherwise, the HMVP buffer is maintained. Thereafter, the prediction process (for example, based on the merge or MVP mode) for each CU in the corresponding CTU is performed, and at this time, the candidate stored in the HMVP buffer may be included as a motion information candidate (for example, merge candidate or MVP candidate) in the merge mode or the MVP mode. The motion information of the target block (current block) derived in the inter prediction process based on the merge mode or the MVP mode is stored (updated) in the HMVP buffer as a new HMVP candidate. In this case, the above-described redundancy check process may be further performed. The above-described procedure may also be repeated for the 이후 CU and the CTU.

As another example, when the HMVP is applied, the dependency of the CTU unit may also be eliminated by initializing the HMVP buffer for every CTU.

Figure 15:
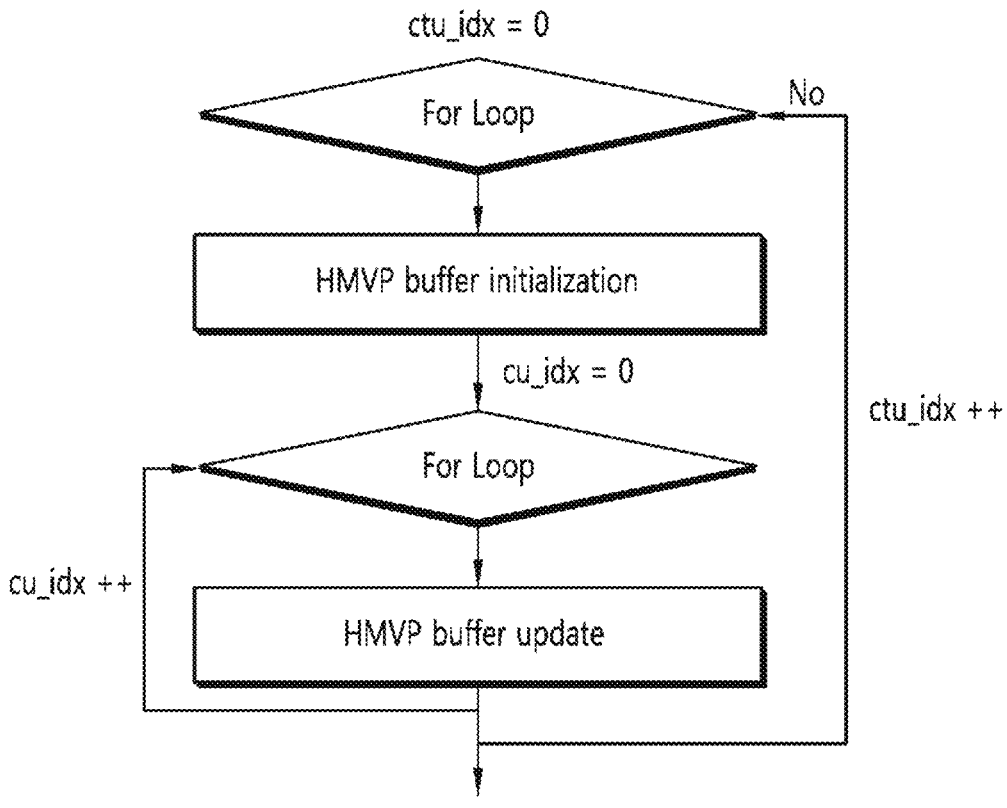
FIG. 15 is a diagram exemplarily showing an HMVP buffer management method according to another embodiment.

FIG. 15 exemplarily illustrates an HMVP buffer management method according to another embodiment.

Referring to FIG. 15, the HMVP buffer initialization may be performed for every CTU without determining whether the current CTU is the firstly-ordered CTU in each CTU row. In this case, since the HMVP buffer is initialized in units of CTUs, motion information of the blocks existing in the CTU is stored in the HMVP table. In this case, the HMVP candidate may be derived based on the motion information of the blocks (for example, CUs) in the same CTU, and the HMVP buffer initialization may be performed as follows without determining whether the current CTU is the firstly-ordered CTU in each CTU row.

As described above, the HMVP buffer may be initialized in units of slices, and therefore, it is possible to use a motion vector of the block spatially spaced apart from the current block. However, in this case, since the parallel processing may not be supported in the slice, the above-described embodiments have proposed a method of initializing the buffer in units of CTU rows or CTUs. That is, according to embodiments of the present document, the HMVP buffer may be initialized in units of slices, and may be initialized in units of CTU rows in the slice.

Meanwhile, when coding (encoding/decoding) one picture, the corresponding picture may also be split in units of slices, and/or the corresponding picture may also be split in units of tiles. For example, the corresponding picture may be split in units of slices in consideration of error resilience, or the corresponding picture may also be split in units of tiles to encode/decode some regions in the corresponding picture. When one picture is split into multiple tiles, in the case of applying the HMVP management buffer, the initialization in units of CTU rows in the corresponding picture, that is, the initialization of the HMVP buffer at the firstly-ordered CTU in each CTU row in the picture is not suitable for the tile structure for encoding/decoding a portion of the picture.

Figure 16:
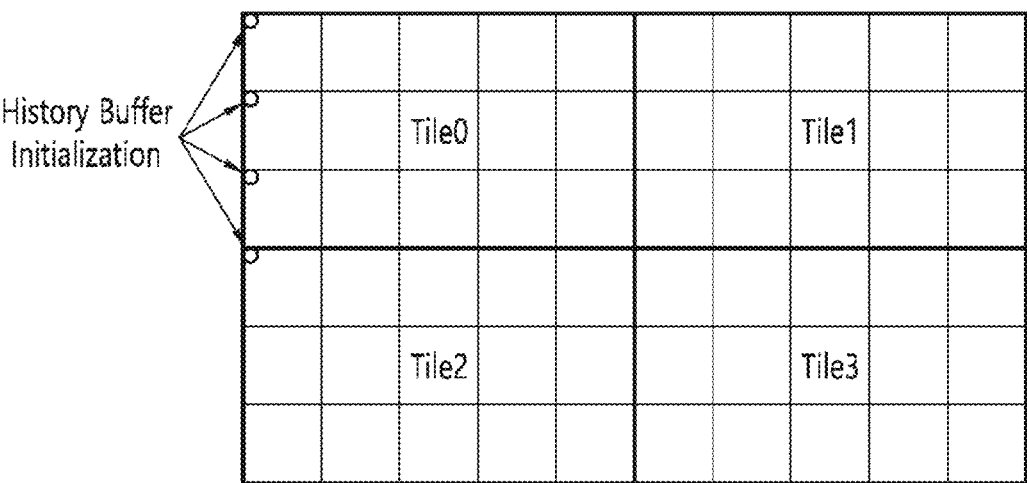
FIG. 16 is a diagram exemplarily showing an HMVP buffer initializing method in a tile structure.

FIG. 16 exemplarily illustrates an HMVP buffer initializing method in the tile structure.

As in FIG. 16, since the HMVP management buffer is not initialized for each tile unit in the case of a tile 1 and a tile 3, the (HMVP) dependency on a tile 0 and a tile 2 occurs. Therefore, when a tile exists, it is possible to initialize the HMVP buffer by the following method.

For example, the HMVP buffer may be initialized in units of CTUs. It is natural that this method may be applied without distinguishing the tile, the slice, and the like.

As another example, the HMVP buffer may be initialized for the firstly-ordered CTU of each tile.

Figure 17:
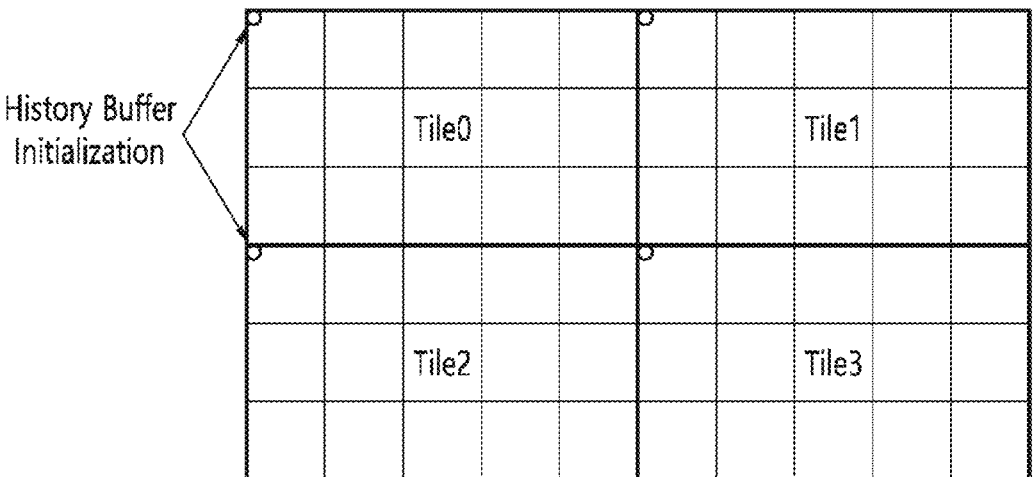
FIG. 17 is a diagram showing an example of an HMVP buffer initializing method for a firstly-ordered CTU of a tile according to another embodiment.

FIG. 17 illustrates an example of an HMVP buffer initializing method for a firstly-ordered CTU in a tile according to another embodiment.

Referring to FIG. 17, in coding the firstly-ordered CTU of each tile, the HMVP buffer is initialized. That is, an HMVP buffer 0 may be initialized and used when coding a tile 0, and an HMVP buffer 1 may be initialized and used when coding a tile 1.

As still another example, the HMVP buffer may be initialized for the firstly-ordered CTU of the CTU row in each tile.

Figure 18:
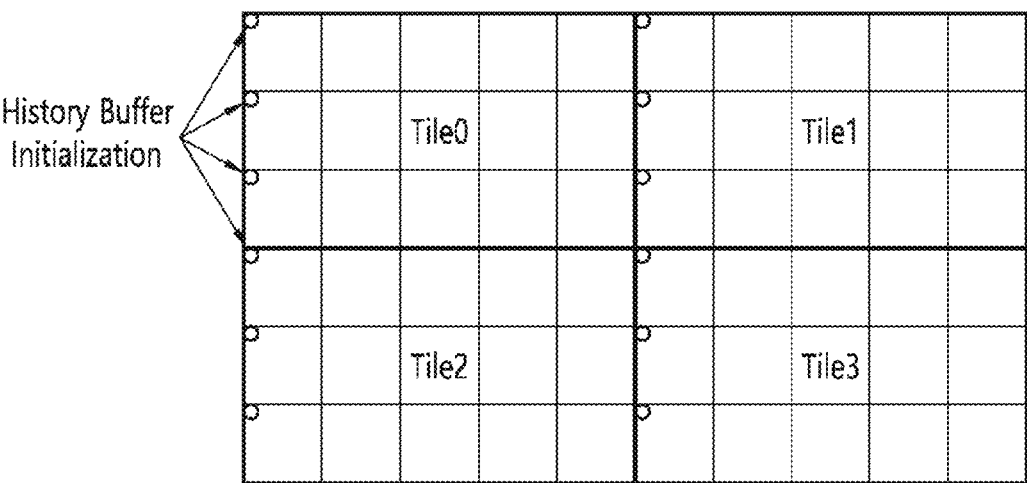
FIG. 18 is a diagram showing an example of an HMVP management buffer initializing method for a firstly-ordered CTU in a CTU row in each tile according to still another embodiment.

FIG. 18 illustrates an example of an HMVP management buffer initializing method for the firstly-ordered CTU in a CTU row in each tile according to still another embodiment.

Referring to FIG. 18, an HMVP buffer may be initialized for each CTU row of each tile. For example, the HMVP buffer may be initialized at the firstly-ordered CTU of the firstly-ordered CTU row of a tile n, the HMVP buffer may be initialized at the firstly-ordered CTU of the secondly-ordered CTU row of the tile n, and the HMVP buffer may be initialized at the firstly-ordered CTU of the third-ordered CTU row of the tile n. In this case, if the coding apparatus includes a multi-core processor, the coding apparatus may initialize and use an HMVP buffer 0 for the firstly-ordered CTU row of the tile n, initialize and use an HMVP buffer 1 for the secondly-ordered CTU row of the tile n, and initialize and use an HMVP buffer 2 for the third-ordered CTU row of the tile n, thereby supporting the parallel processing. Meanwhile, if the coding apparatus includes a single core processor, the coding apparatus may initialize and reuse the HMVP buffer at the firstly-ordered CTU in each CTU row in each tile according to the coding order.

Meanwhile, according to the tile split structure and the slice split structure, the tile and the slice may exist simultaneously in one picture.

Figure 19:
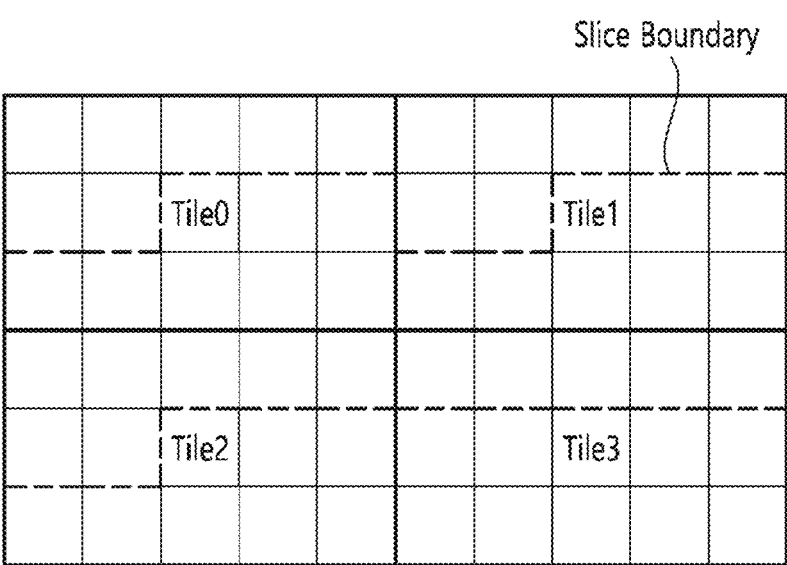
FIG. 19 is a diagram showing an example of a structure in which a tile and a slice exist at the same time.

FIG. 19 illustrates an example of a structure in which a tile and a slice exist simultaneously.

FIG. 19 exemplarily illustrates a case where one picture is split into four tiles, and two slices exist in each tile. As in FIG. 19, there may exist a case where both the slice and the tile exist in one picture, and it is possible to initialize the HMVP buffer as follows.

For example, the HMVP buffer may be initialized in units of CTUs. Such a method may be applied without distinguishing whether the CTU is located in the tile or the slice.

As another example, the HMVP buffer may be initialized for the firstly-ordered CTU in each tile.

Figure 20:
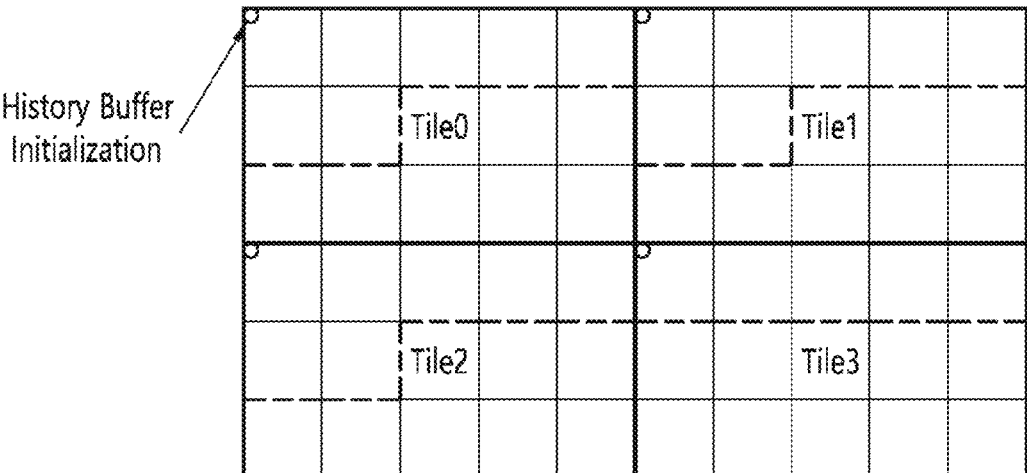
FIG. 20 is a diagram showing a method of initializing an HMVP buffer for a firstly-ordered CTU in each tile.

FIG. 20 illustrates an example of a method of initializing an HMVP buffer for a firstly-ordered CTU in each tile.

Referring to FIG. 20, an HMVP buffer may be initialized at the firstly-ordered CTU of each tile. Even if a plurality of slices exist in one tile, the HMVP buffer may be initialized at the firstly-ordered CTU in the tile.

As still another example, the HMVP buffer may also be initialized for each slice existing in the tile.

Figure 21:
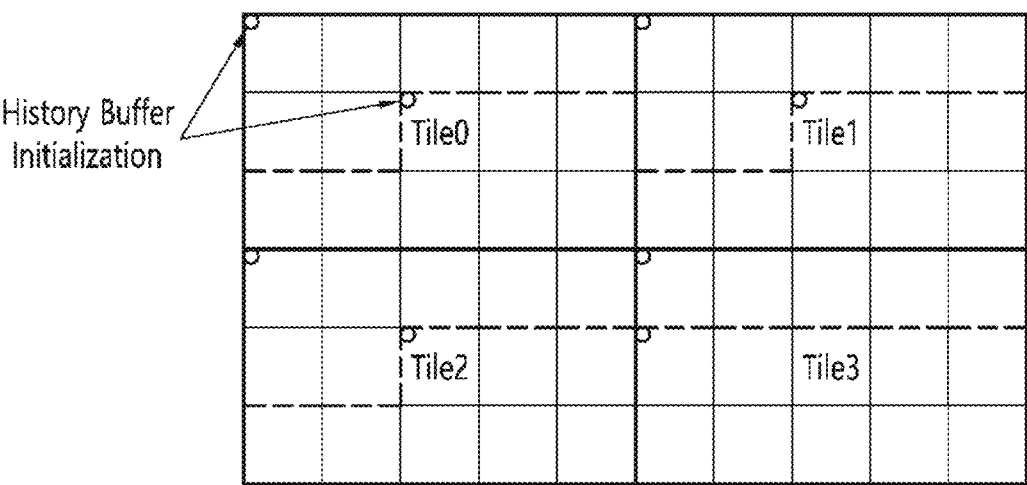
FIG. 21 is a diagram showing an example of a method of initializing an HMVP buffer for each slice in a tile.

FIG. 21 illustrates an example of a method of initializing an HMVP buffer for each slice in a tile.

Referring to FIG. 21, an HMVP buffer may be initialized at the firstly-ordered CTU of each slice in the tile. Therefore, if a plurality of slices exist in one tile, the HMVP buffer may be initialized for each of the plurality of slices. In this case, the HMVP buffer may be initialized when processing the firstly-ordered CTU of each slice.

Meanwhile, a plurality of tiles may exist in one picture without a slice. Alternatively, a plurality of tiles may also exist in one slice. In such a case, the HMVP buffer may be initialized as follows.

For example, an HMVP buffer may be initialized in units of each tile group.

Figure 22:
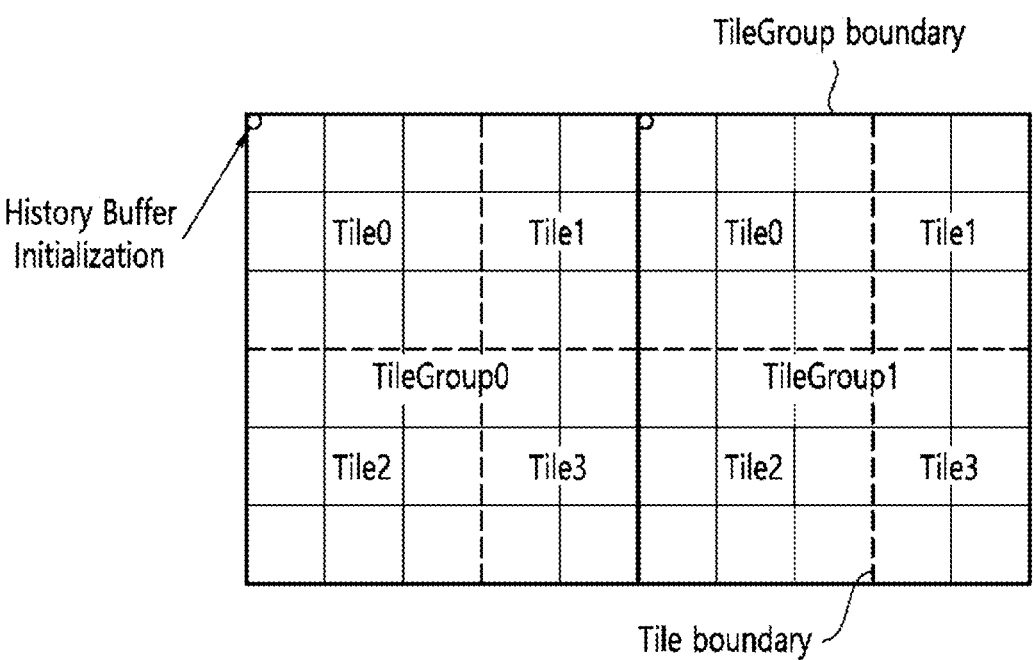
FIG. 22 is a diagram showing an example of initializing an HMVP buffer for a firstly-ordered CTU of a first tile in a tile group.

FIG. 22 illustrates an example of initializing an HMVP buffer for a firstly-ordered CTU of a firstly-ordered tile in a tile group.

Referring to FIG. 22, one picture may be split into two tile groups, and each tile group (TileGroup0 or TileGroup1) may be split into multiple tiles. In this case, the HMVP buffer may be initialized for the firstly-ordered CTU of the firstly-ordered tile in one tile group.

As another example, the HMVP buffer may be initialized in units of tiles in the tile group.

Figure 23:
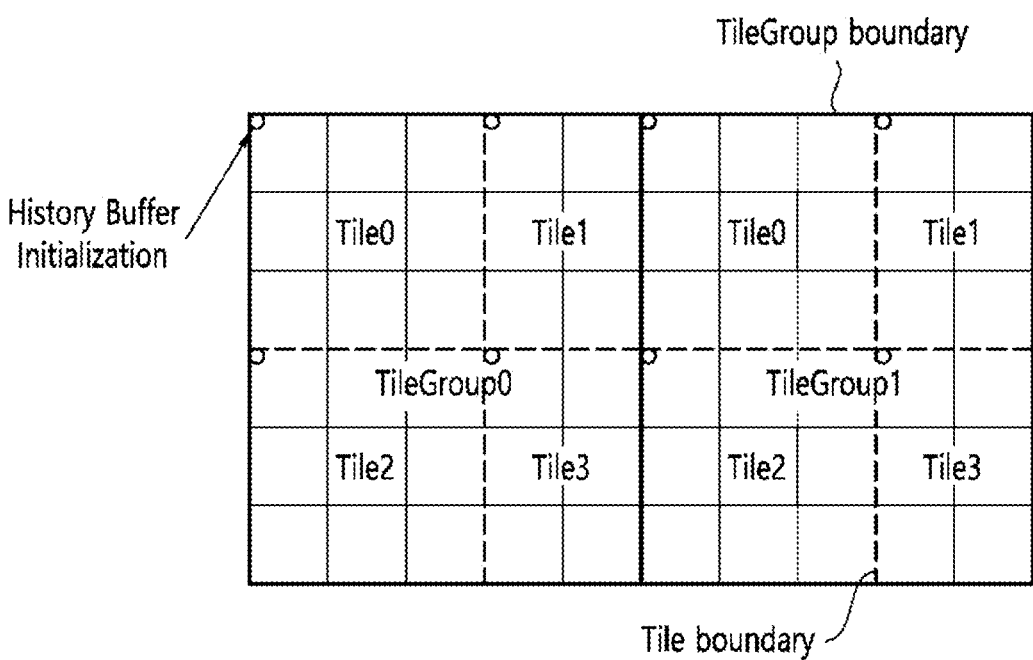
FIG. 23 is a diagram showing an example of initializing an HMVP buffer for a firstly-ordered CTU of each tile in a tile group.

FIG. 23 illustrates an example of initializing an HMVP buffer for a firstly-ordered CTU of each tile in a tile group.

Referring to FIG. 23, one picture may be split into two tile groups, and each tile group (TileGroup0 or TileGroup1) may be split into multiple tiles. In this case, the HMVP buffer may be initialized for the firstly-ordered CTU of each tile in one tile group.

As still another example, the HMVP buffer may be initialized for the CTU row of each tile in the tile group.

Figure 24:
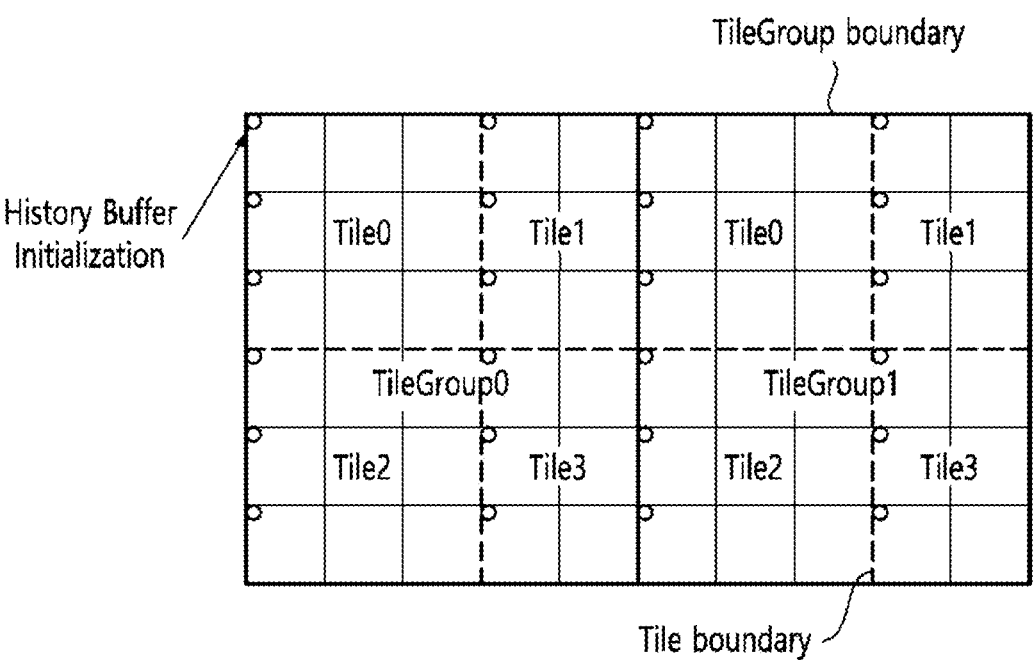
FIG. 24 is a diagram showing an example of initializing an HMVP buffer for a CTU row of each tile in a tile group.

FIG. 24 illustrates an example of initializing an HMVP buffer for a CTU row of each tile in a tile group.

Referring to FIG. 24, one picture may be split into two tile groups, and each tile group (TileGroup0 or TileGroup1) may be split into multiple tiles. In this case, the HMVP buffer may be initialized at the firstly-ordered CTU of the CTU row of each tile in one tile group.

Alternatively, even in this case, the HMVP management buffer may also be initialized in units of CTUs. It is natural that this method may be applied without distinguishing the tile, the slice, the tile group, and the like.

Figure 26:
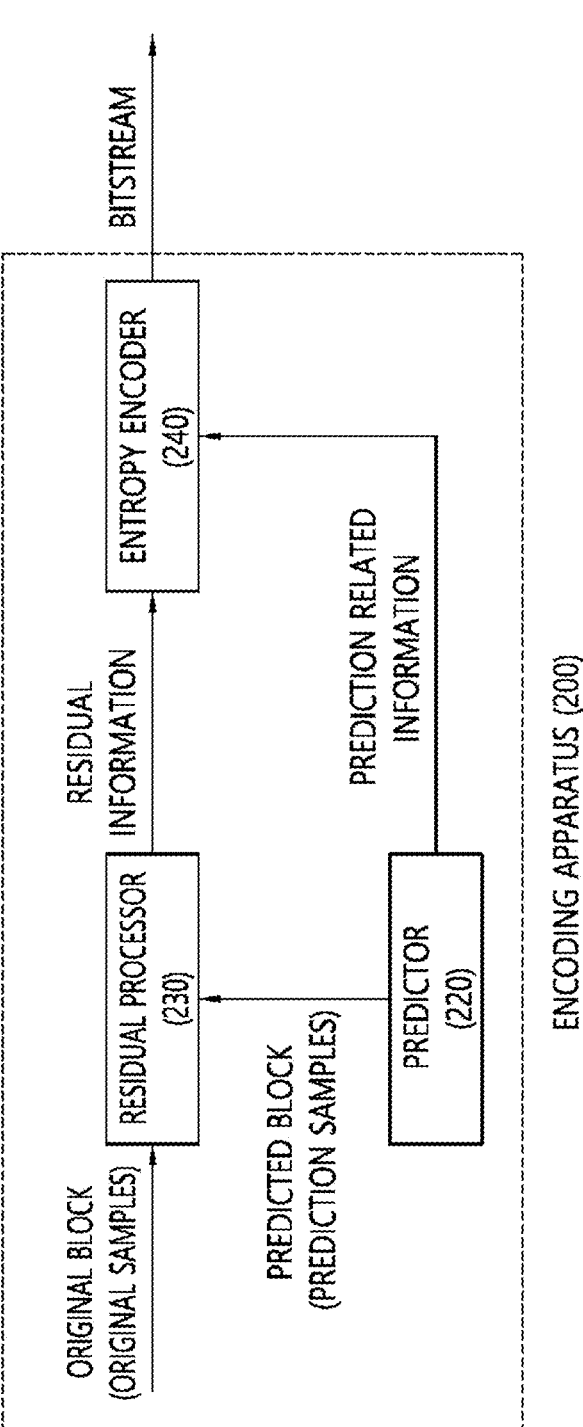

FIGS. 25 and 26 schematically illustrate an example of a video/image encoding method and related components including an inter prediction method according to an embodiment(s) of the present document. The method disclosed in FIG. 25 may be performed by the encoding apparatus disclosed in FIG. 2. Specifically, for example, S2500, S2510, S2520 and S2530 of FIG. 25 may be performed by the predictor 220 of the encoding apparatus, S2540 of FIG. 25 may be performed by the residual processor 230 of the encoding apparatus, and S2550 of FIG. 25 may be performed by the entropy encoder 240 of the encoding apparatus. The method disclosed in FIG. 25 may include the embodiments described above in the present document.

Referring to FIG. 25, the encoding apparatus derives an HMVP buffer for a current block (S2500). The encoding apparatus may perform the HMVP buffer management methods described above in the embodiments of the present document. For example, the HMVP buffer may be initialized in units of slices, tiles, or tile groups, and/or the HMVP buffer may be initialized in units of CTU rows. In this case, the HMVP buffer may be initialized in units of CTU rows in the slice, the tile, or the tile group. Here, the tile may represent a rectangular region of CTUs in the picture. The tile may be specified based on a specific tile row and a specific tile column in the picture. For example, there may exist one or more tiles in the current picture. In this case, the HMVP buffer may be initialized at the firstly-ordered CTU of the CTU row including the current block in the current tile. Alternatively, one or more slices may exist in the current picture. In this case, the HMVP buffer may be initialized at the firstly-ordered CTU of the CTU row including the current block in the current slice. Alternatively, one or more tile groups may exist in the current picture. In this case, the HMVP buffer may be initialized at the firstly-ordered CTU of the CTU row including the current block in the current tile group.

The encoding apparatus may determine whether the current CTU is the firstly-ordered CTU of the CTU row. In this case, the HMVP buffer may be initialized at the firstly-ordered CTU of the CTU row where the current CTU including the current block is located. That is, the HMVP buffer may be initialized when processing the firstly-ordered CTU of the CTU row where the current CTU including the current block is located. If it is determined that the current CTU including the current block is the firstly-ordered CTU of the CTU row in the current tile, the HMVP buffer may include an HMVP candidate derived based on the motion information of the block processed earlier than the current block in the current CTU, and if it is determined that the current CTU is not the firstly-ordered CTU of the CTU row in the current tile, the HMVP buffer may include an HMVP candidate derived based on the motion information of the block processed earlier than the current block in the CTU row in the current tile. In addition, for example, if the current CU which is the current block is located in the firstly-ordered CTU of the CTU row in the current tile, and the current CU corresponds to the firstly-ordered CU of the firstly-ordered CTU, the number of HMVP candidates included in the HMVP buffer is zero. In addition, for example, if a CU coded earlier than the current CU in the CTU row in the current tile (for example, a CU coded earlier than the current CU in the current CTU and/or a CU in a CTU coded earlier than the current CTU of the current CTU row) is coded in an inter mode, an HMVP candidate may be derived based on the motion information of the earlier coded CU and included in the HMVP buffer.

If the current picture is split into a plurality of tiles, the HMVP buffer may be initialized in units of CTU rows in each tile.

The HMVP buffer may be initialized in units of CTU rows in the tile or the slice. For example, if a specific CTU of the CTU row is not the firstly-ordered CTU of the CTU row in the current picture and the specific CTU is the firstly-ordered CTU of the CTU row in the current tile or the current slice, the HMVP buffer may be initialized at the specific CTU.

If the HMVP buffer is initialized, the number of HMVP candidates included in the HMVP buffer may be set to zero.

The encoding apparatus configures a motion information candidate list based on the HMVP buffer (S2510). The HMVP buffer may include an HMVP candidate, and the motion information candidate list including the HMVP candidate may be configured.

For example, if a merge mode is applied to the current block, the motion information candidate list may be a merge candidate list. As another example, if the (A)MVP mode is applied to the current block, the motion information candidate list may be an MVP candidate list. If the merge mode is applied to the current block, the HMVP candidate may be added to the merge candidate list if the number of available merge candidates (for example, spatial merge candidates and temporal merge candidates) in the merge candidate list for the current block is smaller than the predetermined maximum number of merge candidates. In this case, the HMVP candidate may be inserted after the spatial candidates and the temporal candidates in the merge candidate list. That is, the HMVP candidate may be assigned with an index value larger than the index values assigned to the spatial candidates and the temporal candidates in the merge candidate list. If the (A)MVP mode is applied to the current block, the HMVP candidate may be added to the MVP candidate list if the number of available MVP candidates (derived based on spatial neighboring blocks and temporal neighboring blocks) in the MVP candidate list for the current block is smaller than two.

The encoding apparatus may derive the motion information of the current block based on the motion information candidate list (S2520).

The encoding apparatus may derive the motion information of the current block based on the motion information candidate list. For example, if the merge mode or the MVP mode is applied to the current block, the HMVP candidate included in the HMVP buffer may be used as a merge candidate or an MVP candidate. For example, if the merge mode is applied to the current block, the HMVP candidate included in the HMVP buffer may be included as a candidate of the merge candidate list, and the HMVP candidate among the candidates included in the merge candidate list may be indicated based on the merge index. The merge index may be included in the image/video information to be described later as prediction related information. In this case, the HMVP candidate may be assigned with an index in the merge candidate list with a lower priority than the spatial merge candidates and the temporal merge candidates included in the merge candidate list. That is, the index value assigned to the HMVP candidate may be assigned with a higher value than the index values of the spatial merge candidates and the temporal merge candidate. As another example, if the MVP mode is applied to the current block, the HMVP candidate included in the HMVP buffer may be included as a candidate of the merge candidate list, and the HMVP candidate among the candidates included in the MVP candidate list may be indicated based on an MVP flag (or MVP index). The MVP flag (or MVP index) may be included in the image/video information to be described later as prediction related information.

The encoding apparatus generates prediction samples for the current block based on the derived motion information (S2530). The encoding apparatus may derive prediction samples by using reference samples indicated by the motion information on a reference picture by performing inter prediction (motion compensation) based on the motion information.

The encoding apparatus generates residual samples based on the prediction samples (S2540). The encoding apparatus may generate residual samples based on the original samples for the current block and the prediction samples for the current block.

The encoding apparatus derives information on the residual samples based on the residual samples, and encodes the image/video information including the information on the residual samples (S2550). The information on the residual samples may be called residual information, and may include information on quantized transform coefficients. The encoding apparatus may derive the quantized transform coefficients by performing transform/quantization procedures for the residual samples.

The encoded image/video information may be output in the form of a bitstream. The bitstream may be transmitted to the decoding apparatus via a network or a storage medium. The image/video information may further include prediction related information, and the prediction related information may further include information on various prediction modes (for example, merge mode, MVP mode, and the like), MVD information, and the like.

Figure 27:
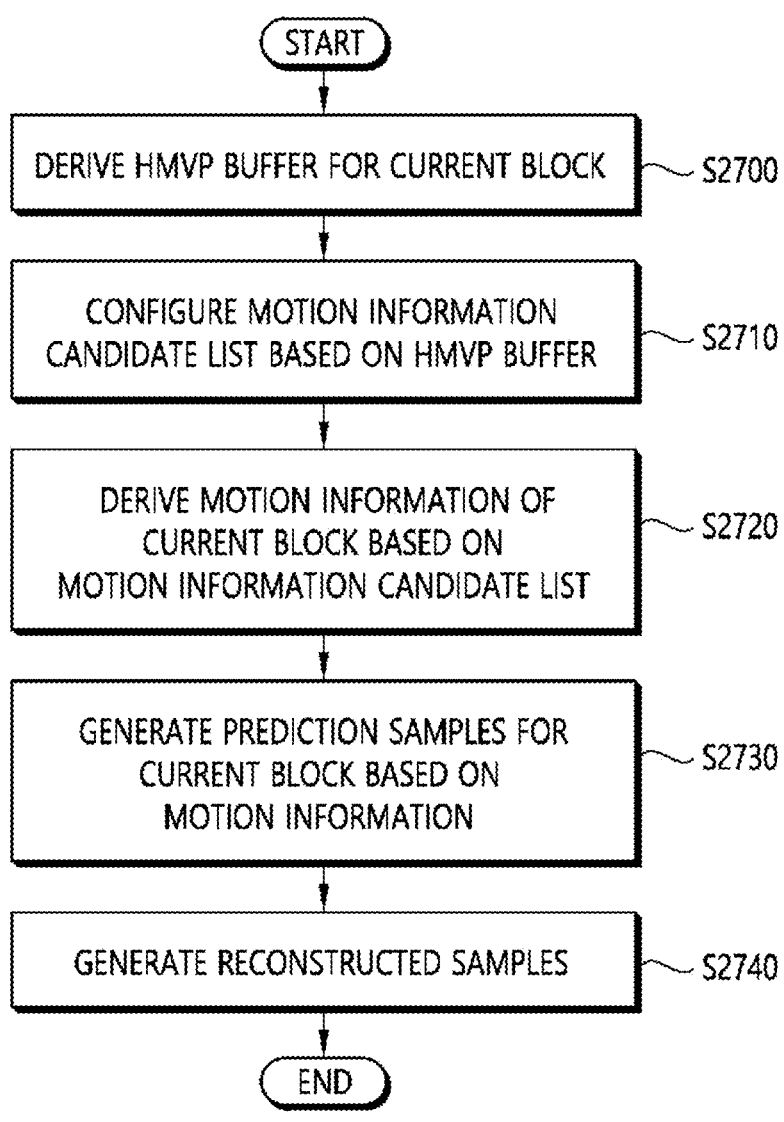
FIGS. 27 and 28 are diagrams schematically showing an example of an image decoding method and related components including an inter prediction method according to an embodiment of the present document.
Figure 28:
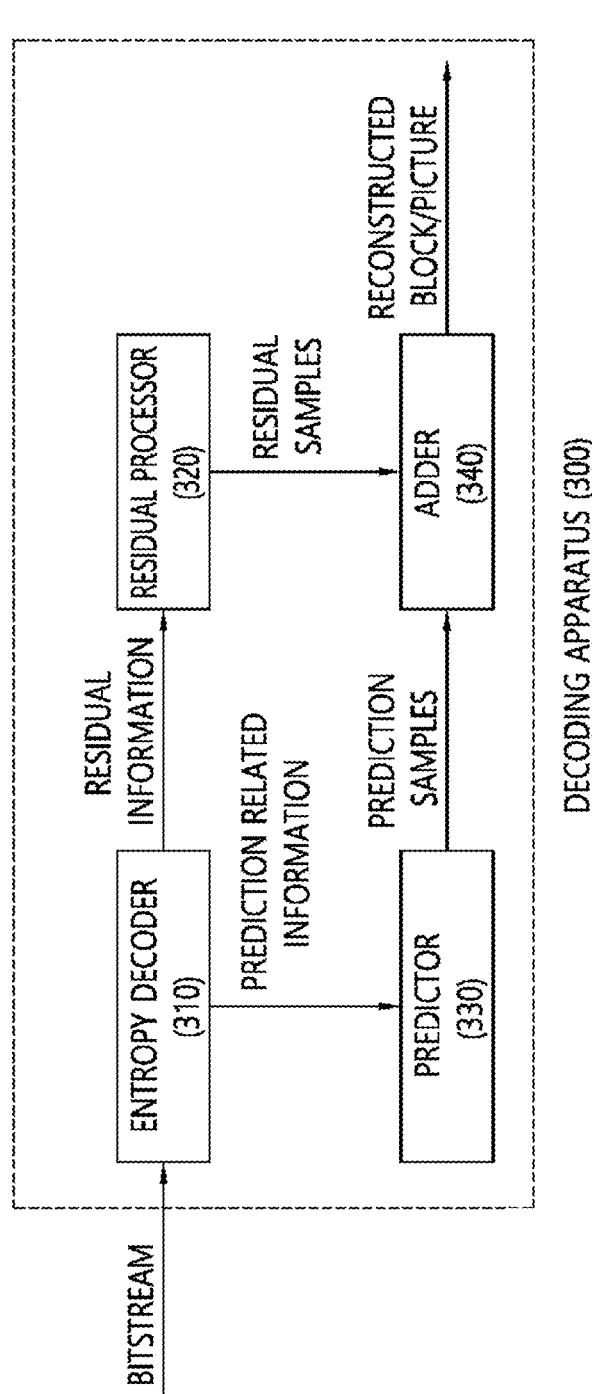

FIGS. 27 and 28 schematically illustrate an example of an image decoding method and related components including an inter prediction method according to an embodiment of the present document. The method disclosed in FIG. 27 may be performed by the decoding apparatus disclosed in FIG. 3. Specifically, for example, S2700, S2710, S2720 and S2730 of FIG. 27 may be performed by the predictor 330 of the decoding apparatus, and S2740 may be performed by the adder 340 of the decoding apparatus. The method disclosed in FIG. 27 may include the embodiments described above in present document.

Referring to FIG. 27, the decoding apparatus derives an HMVP buffer for the current block (S2700). The decoding apparatus may perform the HMVP buffer management methods described above in the embodiments of the present document. For example, the HMVP buffer may be initialized in units of slices, tiles, or tile groups and/or the HMVP buffer may be initialized in units of CTU rows. In this case, the HMVP buffer may be initialized in units of CTU rows in the slice, the tile, or the tile group. Here, the tile may represent a rectangular region of the CTUs in the picture. The tile may be specified based on a specific tile row and a specific tile column in the picture. For example, there may exist one or more tiles in the current picture. In this case, the HMVP buffer may be initialized at the firstly-ordered CTU of the CTU row including the current block in the current tile. Alternatively, one or more slices may exist in the current picture. In this case, the HMVP buffer may be initialized at the firstly-ordered CTU of the CTU row including the current block in the current slice. Alternatively, one or more tile groups may exist in the current picture. In this case, the HMVP buffer may be initialized at the firstly-ordered CTU of the CTU row including the current block in the current tile group.

The decoding apparatus may determine whether the current CTU is the firstly-ordered CTU of the CTU row. In this case, the HMVP buffer may be initialized at the firstly-ordered CTU of the CTU row where the current CTU including the current block is located. That is, the HMVP buffer may be initialized when processing the firstly-ordered CTU of the CTU row where the current CTU including the current block is located. If it is determined that the current CTU including the current block is the firstly-ordered CTU of the CTU row in the current tile, the HMVP buffer may include the HMVP candidate derived based on the motion information of the block processed earlier than the current block in the current CTU, and if it is determined that the current CTU is not the firstly-ordered CTU of the CTU row in the current tile, the HMVP buffer may include the HMVP candidate derived based on the motion information of the block processed earlier than the current block in the CTU row in the current tile. In addition, for example, if the current CU which is the current block is located in the firstly-ordered CTU of the CTU row in the current tile, and current CU corresponds to the firstly-ordered CU of the firstly-ordered CTU, the number of HMVP candidates included in the HMVP buffer is zero. In addition, for example, a CU coded earlier than the current CU in the CTU row in the current tile (for example, a CU coded earlier than the current CU in the current CTU and/or a CU in a CTU coded earlier than the current CTU of the current CTU row) is coded in an inter mode, an HMVP candidate may be derived based on the motion information of the earlier coded CU and included in the HMVP buffer.

If the current picture is split into a plurality of tiles, the HMVP buffer may be initialized in units of CTU rows in each tile.

The HMVP buffer may be initialized in units of CTU rows in the tile or the slice. For example, if a specific CTU of the CTU row is not the firstly-ordered CTU of the CTU row in the current picture and the specific CTU is the firstly-ordered CTU of the CTU row in the current tile or the current slice, the HMVP buffer may be initialized at the specific CTU.

If the HMVP buffer is initialized, the number of HMVP candidates included in the HMVP buffer may be set to zero.

The decoding apparatus configures a motion information candidate list based on the HMVP buffer (S2710). The HMVP buffer may include an HMVP candidate, and the motion information candidate list including the HMVP candidate may be configured.

For example, if a merge mode is applied to the current block, the motion information candidate list may be a merge candidate list. As another example, if the (A)MVP mode is applied to the current block, the motion information candidate list may be an MVP candidate list. If the merge mode is applied to the current block, the HMVP candidate may be added to the merge candidate list if the number of available merge candidates (for example, spatial merge candidates and temporal merge candidates) in the merge candidate list for the current block is smaller than the predetermined maximum number of merge candidates. In this case, the HMVP candidate may be inserted after the spatial candidates and the temporal candidates in the merge candidate list. That is, the HMVP candidate may be assigned with an index value larger than the index values assigned to the spatial candidates and the temporal candidates in the merge candidate list. If the (A)MVP mode is applied to the current block, the HMVP candidate may be added to the MVP candidate list if the number of available MVP candidates (derived based on spatial neighboring blocks and temporal neighboring blocks) in the MVP candidate list for the current block is smaller than two.

The decoding apparatus may derive motion information of the current block based on the motion information candidate list (S2720).

The decoding apparatus may derive the motion information of the current block based on the motion information candidate list. For example, if a merge mode or an MVP mode is applied to the current block, the HMVP candidate included in the HMVP buffer may be used as a merge candidate or a MVP candidate. For example, if the merge mode is applied to the current block, the HMVP candidate included in the HMVP buffer may be included as a candidate of a merge candidate list, and the HMVP candidate among the candidates included in the merge candidate list may be indicated based on the merge index acquired from the bitstream. In this case, the HMVP candidate may be assigned with an index in the merge candidate list with a lower priority than the spatial merge candidates and the temporal merge candidates included in the merge candidate list. That is, the index value assigned to the HMVP candidate may be assigned with a higher value than the index values of the spatial merge candidates and the temporal merge candidate. As another example, if the MVP mode is applied to the current block, the HMVP candidate included in the HMVP buffer may be included as a candidate of a merge candidate list, and the HMVP candidate among the candidates included in the MVP candidate list may be indicated based on an MVP flag (or MVP index) acquired from the bitstream.

The decoding apparatus generates prediction samples for the current block based on the derived motion information (S2730). The decoding apparatus may derive prediction samples by using reference samples indicated by the motion information on a reference picture by performing inter prediction (motion compensation) based on the motion information. The current block including the prediction samples may be called a predicted block.

The decoding apparatus generates reconstructed samples based on the prediction samples (S2740). As described above, a reconstructed block/picture may be generated based on the reconstructed samples. As described above, the decoding apparatus may acquire residual information (including information on quantized transform coefficients) from the bitstream, derive the residual samples from the residual information, and generate the reconstructed samples based on the prediction samples and the residual samples. Thereafter, as described above, an in-loop filtering procedure such as deblocking filtering, SAO, and/or ALF procedure may be applied to the reconstructed picture in order to improve subjective/objective picture quality as necessary.

In the above-described embodiment, the methods are described based on the flowchart as a series of steps or blocks, but the corresponding embodiment is not limited to the order of steps, and a certain step may occur in different order from or simultaneously with the step different from that described above. In addition, those skilled in the art will understand that the steps shown in the flowchart are not exclusive and other steps may be included or one or more steps in the flowcharts may be deleted without affecting the scope of the embodiments of the present document.

The above-described method according to the embodiments of the present document may be implemented in the form of software, and the encoding apparatus and/or the decoding apparatus according to the present document may be included in the apparatus for performing image processing of, for example, a TV, a computer, a smartphone, a set-top box, a display device, and the like.

When the embodiments in the present document are implemented in software, the above-described method may be implemented as a module (process, function, and the like) for performing the above-described function. The module may be stored in a memory and executed by a processor. The memory may be located inside or outside the processor, and may be coupled with the processor by various well-known means. The processor may include an application-specific integrated circuit (ASIC), other chipsets, logic circuits, and/or data processing devices. The memory may include a read-only memory (ROM), a random access memory (RAM), a flash memory, a memory card, a storage medium and/or other storage devices. That is, the embodiments described in the present document may be implemented and performed on a processor, a microprocessor, a controller, or a chip. For example, the functional units shown in each drawing may be implemented and performed on a computer, a processor, a microprocessor, a controller, or a chip. In this case, information for implementation (for example, information on instructions) or an algorithm may be stored in a digital storage medium.

In addition, the decoding apparatus and encoding apparatus to which an embodiment(s) of the present document is (are) applied may be included in a multimedia broadcasting transmitting and receiving device, a mobile communication terminal, a home cinema video device, a digital cinema video device, a surveillance camera, a video chat device, a real time communication device such as video communication, a mobile streaming device, a storage medium, a camcorder, a Video on Demand (VOD) service provider, an Over the top video (OTT) device, an Internet streaming service provider, a 3D video device, a virtual reality device, an augmented reality (AR) device, a video telephony video device, a transportation means terminal (for example, a vehicle (including an autonomous vehicle) terminal, an airplane terminal, a ship terminal, or the like), a medical video device, or the like, and may be used to process video signals or data signals. For example, the Over the top video (OTT) device may include a game console, a Blu-ray player, an Internet access TV, a home theater system, a smartphone, a tablet PC, a digital video recorder (DVR), and the like.

In addition, the processing method to which an embodiment(s) of the present document is (are) applied may be produced in the form of a program executed by a computer, and may be stored in a computer-readable recording medium. Multimedia data having a data structure according to the embodiment(s) of present document may also be stored in the computer-readable recording medium. The computer-readable recording medium includes all kinds of storage devices and distributed storage devices in which computer-readable data is stored. The computer-readable recording medium may include, for example, a Blu-ray disc (BD), a universal serial bus (USB), a ROM, a PROM, an EPROM, an EEPROM, a RAM, a CD-ROM, a magnetic tape, a floppy disk, and an optical data storage device. In addition, the computer-readable recording medium also includes media implemented in the form of a carrier wave (for example, transmission over the Internet). In addition, the bitstream generated by the encoding method may be stored in the computer-readable recording medium or transmitted through a wired and wireless communication network.

In addition, the embodiment(s) of the present document may be implemented as a computer program product by a program code, and the program code may be performed on a computer by the embodiment(s) of the present document. The program code may be stored in a carrier readable by a computer.

Figure 29:
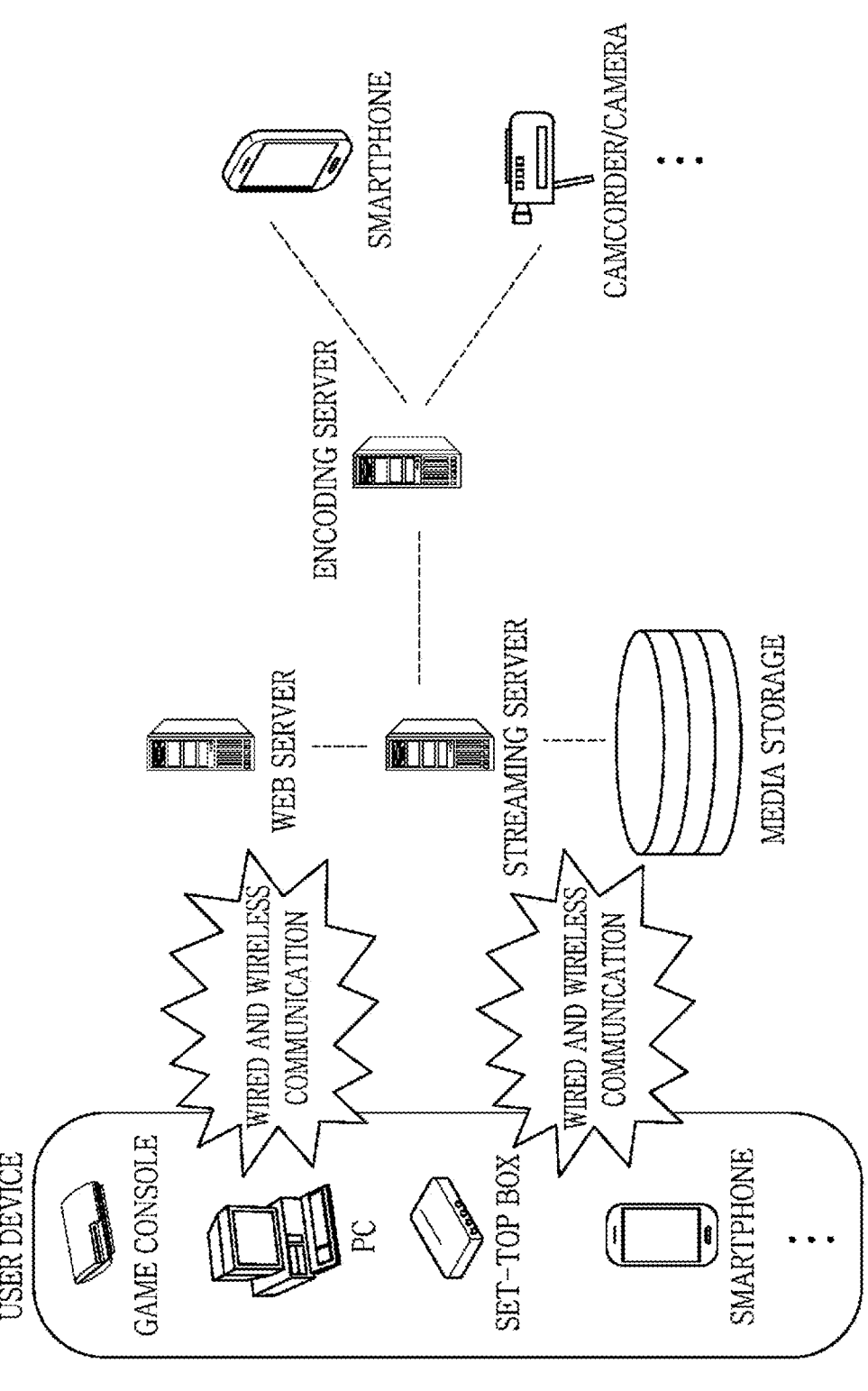
FIG. 29 is a diagram showing an example of a contents streaming system to which embodiments disclosed in the present document may be applied.

FIG. 29 illustrates an example of a contents streaming system to which the present disclosure may be applied.

Referring to FIG. 29, the contents streaming system to which the disclosure is applied may largely include an encoding server, streaming server, web server, media storage, user device, and multimedia input device.

The encoding server performs the role of generating a bitstream by compressing contents input from multimedia input devices such as a smartphone, camera, or camcorder into digital data and transmitting the generated bitstream to the streaming server. As another example, if multimedia input devices such as a smartphone, camera, or camcorder directly produce a bitstream, the encoding server may be omitted.

The bitstream may be generated by an encoding method or a method for generating a bitstream to which the present disclosure are applied, and the streaming server may temporarily store the bitstream while the bitstream is transmitted or received.

The streaming server performs the role of transmitting multimedia data to a user device based on a user request through a web server, and the web server performs the role of informing the user of which services are available. If the user requests a desired service from the web server, the web server transmits the request to the streaming server, and the streaming server transmits multimedia data to the user. At this time, the contents streaming system may include a separate control server, and in this case, the control server performs the role of controlling commands/responses between devices within the contents streaming system.

The streaming server may receive contents from a media storage and/or encoding server. For example, if contents are received from the encoding server, the contents may be received in real-time. In this case, to provide a smooth streaming service, the streaming server may store the bitstream for a predetermined time period.

Examples of the user device may include a mobile phone, smartphone, laptop computer, digital broadcast terminal, personal digital assistant (PDA), portable multimedia player (PMP), navigation terminal, slate PC, tablet PC, ultrabook, wearable device (for example, a smart watch or a smart glass), digital TV, desktop computer, and digital signage.

Each individual server within the contents streaming system may be operated as a distributed server, and in this case, data received by each server may be processed in a distributed manner.

What is claimed is:
1. An image decoding method performed by a decoding apparatus, the method comprising:
  deriving a history-based motion vector prediction (HMVP) buffer for a current block;
  configuring motion information candidate list based on an HMVP candidate comprised in the HMVP buffer, wherein whether to add the HMVP candidate to the motion information candidate list is checked after a temporal candidate in the motion information candidate list;
  deriving motion information of the current block based on the motion information candidate list;
  deriving a reference picture index of the current block based on the motion information;
  deriving a motion vector of the current block based on the motion information;
  generating prediction samples for the current block based on the reference picture index and the motion vector; and
  generating reconstructed samples based on the prediction samples,
  wherein a current picture includes one or more tiles,
  wherein the current picture includes plurality of tile columns and tile rows, wherein a tile is a rectangular region of coding tree units (CTUs) within a tile column and a tile row in the current picture,
  wherein the current block is for one of coding units (CUs) split from a coding tree unit (CTU),
  wherein the HMVP buffer is updated based on motion information of a previous block,
  wherein the HMVP buffer is initialized at a firstly-ordered CTU per each CTU row of each tile,
  wherein based on HMVP buffer being initialized, a number of HMVP candidates comprised in the HMVP buffer is set to zero,
  wherein the method further comprising:
  determining whether the CTU is a firstly-ordered CTU in a CTU row of a current tile,
  wherein the HMVP buffer for the current block is derived based on the result of the determination, and
  wherein based on the result of the determining that the CTU is the firstly-ordered CTU in the CTU row of the current tile, the HMVP buffer is initialized for the CTU.
2. An image encoding method performed by an encoding apparatus, the method comprising:
  deriving a history-based motion vector prediction (HMVP) buffer for a current block;
  configuring a motion information candidate list based on an HMVP candidate comprised in the HMVP buffer, wherein whether to add the HMVP candidate to the motion information candidate list is checked after a temporal candidate in the motion information candidate list;
  deriving motion information of the current block based on the motion information candidate list;
  deriving a reference picture index of the current block based on the motion information;
  deriving a motion vector of the current block based on the motion information;
  generating prediction samples for the current block based on the reference picture index and the motion vector;
  deriving residual samples based on the prediction samples; and
  encoding image information comprising information on the residual samples,
  wherein one or more tiles are present in a current picture,
  wherein the current picture includes plurality of tile columns and tile rows,
  wherein a tile is a rectangular region of coding tree units (CTUs) within a tile column and a tile row in the current picture,
  wherein the current block is for one of coding units (CUs) split from a coding tree unit (CTU),
  wherein the HMVP buffer is updated based on motion information of a previous block,
  wherein the HMVP buffer is initialized at a firstly-ordered CTU per each CTU row of each tile,
  wherein based on HMVP buffer being initialized, a number of HMVP candidates comprised in the HMVP buffer is set to zero,
  wherein the method further comprising:
  determining whether the CTU is a firstly-ordered CTU in a CTU row of a current tile,
  wherein the HMVP buffer for the current block is derived based on the result of the determination, and
  wherein based on the result of the determining that the CTU is the firstly-ordered CTU in the CTU row of the current tile, the HMVP buffer is initialized for the CTU.
3. A transmission method of data for image, the transmission method comprising:

obtaining a bitstream generated by a method, wherein the method comprises deriving a history-based motion vector prediction (HMVP) buffer for a current block, configuring a motion information candidate list based on an HMVP candidate comprised in the HMVP buffer, wherein whether to add the HMVP candidate to the motion information candidate list is checked after a temporal candidate in the motion information candidate list, deriving motion information of the current block based on the motion information candidate list, deriving a reference picture index of the current block based on the motion information, deriving a motion vector of the current block based on the motion information, generating prediction samples for the current block based on the reference picture index and the motion vector, deriving residual samples based on the prediction samples, and generating the bitstream by encoding image information comprising information on the residual samples; and transmitting the data comprising the bitstream, wherein one or more tiles are present in a current picture, wherein the current picture includes plurality of tile columns and tile rows, wherein a tile is a rectangular region of coding tree units (CTUs) within a tile column and a tile row in the current picture, wherein the current block is for one of coding units (CUs) split from a coding tree unit (CTU), wherein the HMVP buffer is updated based on motion information of a previous block, wherein the HMVP buffer is initialized at a firstly-ordered CTU per each CTU row of each tile, wherein based on HMVP buffer being initialized, a number of HMVP candidates comprised in the HMVP buffer is set to zero, wherein the method further comprising:

determining whether the CTU is a firstly-ordered CTU in a CTU row of a current tile, wherein the HMVP buffer for the current block is derived based on the result of the determination, and wherein based on the result of the determining that the CTU is the firstly-ordered CTU in the CTU row of the current tile, the HMVP buffer is initialized for the CTU.

* * * * *